US012793921B2

(12) United States Patent
Okuda et al.

(10) Patent No.: US 12,793,921 B2
(45) Date of Patent: Nov. 10, 2026

(54) ELECTROMAGNETIC RELAY

(71) Applicant: OMRON Corporation, Kyoto (JP)

(72) Inventors: Mitsuru Okuda, Kyoto (JP); Taira Minamizaki, Kyoto (JP); Hitoshi Sakamoto, Kyoto (JP); Shinya Yakata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 198 days.

(21) Appl. No.: 18/967,665

(22) Filed: Dec. 4, 2024

(65) Prior Publication Data

US 2025/0210294 A1 Jun. 26, 2025

(30) Foreign Application Priority Data

Dec. 25, 2023 (JP) ................................ 2023-218503

(51) Int. Cl.

*H01H 51/29* (2006.01)
*H01H 45/04* (2006.01)
*H01H 45/14* (2006.01)

(52) U.S. Cl.

CPC ............ *H01H 51/29* (2013.01); *H01H 45/04* (2013.01); *H01H 45/14* (2013.01); *H01H 2201/008* (2013.01)

(58) Field of Classification Search

CPC ........ H01H 51/29; H01H 45/04; H01H 45/14; H01H 2201/008; H01H 50/641; H01H 50/541; H01H 2050/028; H01H 50/546; H01H 50/54; H01H 50/04; H01H 50/18; H01H 50/44

USPC .............................................................. 335/2

See application file for complete search history.

(56) References Cited

U.S. PATENT DOCUMENTS

| | | | | |
|---|---|---|---|---|
| 11,705,297 B2 * | 7/2023 | Miyake | .................. | H01H 50/02<br>335/2 |
| 11,735,389 B2 * | 8/2023 | Miyake | .............. | H01H 11/0062<br>335/2 |
| 2022/0122795 A1 * | 4/2022 | Miyake | .................. | H01H 50/02 |
| 2022/0122797 A1 * | 4/2022 | Miyake | ................ | H01H 50/045 |

FOREIGN PATENT DOCUMENTS

| | | |
|---|---|---|
| JP | 2002-42626 A | 2/2002 |

* cited by examiner

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a base, a main contact unit having a movable contact piece and a first movable member, a coil unit, an auxiliary contact unit, and a second movable member. The movable contact piece extends in a lateral direction. The first movable member is movable in a movement direction perpendicular to the lateral direction between a first closed position and a first open position. The main contact unit is supported by the base in a support direction perpendicular to the lateral direction and the movement direction. The coil unit is supported by the base in the support direction. The auxiliary contact unit is disposed on the opposite side of the main contact unit with respect to the coil unit in the movement direction. The second movable member moves in the movement direction in conjunction with the first movable member.

16 Claims, 22 Drawing Sheets

ELECTROMAGNETIC RELAY

CROSS-REFERENCE TO RELATED APPLICATION

This application claims priority to Japanese Patent Application No. 2023-218503, filed Dec. 25, 2023. The contents of that application are incorporated by reference herein in their entirety.

FIELD

The claimed invention relates to an electromagnetic relay.

BACKGROUND

A plunger-type electromagnetic relay includes a pair of fixed terminals, a contact unit, and a coil unit (see, for example, Japanese Patent Application Laid-Open No. 2002-042626). Fixed contacts are connected to the fixed terminals. The contact unit includes a movable contact piece, a pair of movable contacts, and a movable member. The pair of movable contacts are connected to the movable contact piece. The movable member supports the movable contact piece. The coil unit includes a coil and a movable iron core. The movable iron core is connected to the movable member. The movable iron core is moved by the magnetic force generated by the coil. Thereby the movable member moves. This causes the movable contact piece to move, opening and closing the movable contact and the fixed contact.

In the above-mentioned electromagnetic relay, the contact unit and the coil unit are supported by a base. When assembling the electromagnetic relay, the contact unit and the coil unit are attached to the base in the movement direction of the movable member. Therefore, the accuracy of assembly between the contact unit and the coil unit may affect the operation of the electromagnetic relay. For example, the gap distance between the movable contact and the fixed contact may vary depending on the assembly precision, which may affect the operation of the electromagnetic relay.

On the other hand, some electromagnetic relays are provided with an auxiliary contact unit for detecting the open/closed state of the contacts in the main contact unit. The auxiliary contact unit operates in conjunction with the operation of the main contact unit. Therefore, if the operation of the main contact unit is affected by assembly accuracy, the operation of the auxiliary contact unit is also affected. Furthermore, in a case that the auxiliary contact unit is disposed near the main contact unit, the auxiliary contact unit is affected by the opening and closing of the contacts of the main contact unit. However, providing a structure for isolating the auxiliary contact unit from the main contact unit results in an increase in the size of the electromagnetic relay.

SUMMARY

An object of the claimed invention is to reduce the effect of the main contact unit on the operation of the auxiliary contact unit and to prevent the electromagnetic relay from becoming large. An embodiment of an electromagnetic relay in accordance with the claimed invention includes a base, a first fixed terminal, a first fixed contact, a second fixed terminal, a second fixed contact, a main contact unit, a coil unit, an auxiliary contact unit, and a second movable member. The first fixed terminal is supported by the base. The first fixed contact is connected to the first fixed terminal. The second fixed terminal is supported by the base. The second fixed contact is connected to the second fixed terminal. The main contact unit includes a movable contact piece, a first movable contact, a second movable contact, and a first movable member. The movable contact piece extends in a lateral direction. The first movable contact is connected to the movable contact piece. The second movable contact is connected to the movable contact piece. The first movable member holds the movable contact piece between the first movable contact and the second movable contact. The first movable member is movable in a movement direction perpendicular to the lateral direction between a first closed position and a first open position. In a state in which the first movable member is located in the first closed position, the first movable contact contacts the first fixed contact and the second movable contact contacts the second fixed contact. In a state in which the first movable member is located in the first open position, the first movable contact is separated from the first fixed contact and the second movable contact is separated from the second fixed contact. The main contact unit is supported by the base in a first support direction perpendicular to the lateral direction and the movement direction. The coil unit includes a coil, a spool, and a movable iron core. The spool includes a hole extending in the movement direction. The coil is wound around the spool. The movable iron core is disposed within the hole of the spool. The movable iron core is connected to the first movable member. The coil unit is supported by the base in the first support direction. The auxiliary contact unit includes an auxiliary fixed terminal, an auxiliary movable terminal, and an auxiliary movable contact. The auxiliary fixed terminal is electrically insulated from the first fixed terminal and the second fixed terminal. The auxiliary fixed contact is connected to the auxiliary fixed terminal. The auxiliary movable terminal is electrically insulated from the movable contact piece. The auxiliary movable contact is connected to the auxiliary movable terminal. The auxiliary contact unit is disposed on the opposite side of the main contact unit with respect to the coil unit in the movement direction. The second movable member is movable between a second closed position and a second open position. In a state in which the second movable member is located in the second closed position, the auxiliary movable contact contacts the auxiliary fixed contact. In a state in which the second movable member is located in the second open position, the auxiliary movable contact is separated from the auxiliary fixed contact. The second movable member moves in the movement direction in conjunction with the first movable member.

In the electromagnetic relay, the main contact unit and the coil unit are supported by the base in the first support direction. The first support direction is perpendicular to the movement direction of the first movable member. This reduces the effect of assembly accuracy on the operation of the main contact unit and the auxiliary contact unit. The auxiliary contact unit is disposed on the opposite side of the coil unit from the main contact unit in the movement direction of the first movable member. This reduces the effect on the auxiliary contact unit caused by opening and closing of the main contact unit, and prevents the electromagnetic relay from becoming large.

The first movable contact, the second movable contact, and the auxiliary movable contact may be movable in the movement direction. In this case, the auxiliary movable contact moves in the same direction as the first and second movable contacts. This allows the auxiliary movable contact to operate stably.

The movement direction may include a first movement direction from the main contact unit toward the coil unit, and a second movement direction opposite to the first movement direction. The coil unit may further include a fixed iron core disposed to face the movable iron core. The movable iron core may be disposed in the second movement direction with respect to the fixed iron core. The first movable member may move from the first open position to the first closed position by moving in the first movement direction. In this case, the movable iron core is retracted into the spool, thereby the first movable contact and the second movable contact come into contact the first fixed contact and the second fixed contact, respectively. This improves the contact stability of the contacts.

The second movable member may extend through a position located in a second support direction opposite to the first support direction with respect to the coil unit. In this case, the auxiliary movable terminal can be made longer. This makes it easy to adjust the contact force or stroke amount of the auxiliary movable contact. The second movable member may extend through a position located in the lateral direction with respect to the coil unit. In this case, the height of the electromagnetic relay is reduced. The second movable member may extend through the hole of the spool. In this case, the height of the electromagnetic relay is reduced.

The electromagnetic relay may further include a case. The case may be attached to the base. The case may cover the coil unit. The second movable member may include a protrusion that protrudes toward the case. In this case, even if the case is deformed, the operation of the second movable member is stable.

The lateral direction may include a first lateral direction and a second lateral direction opposite the first lateral direction. The case may include a first rib and a second rib. The first rib may protrude from an inner surface of the case. The first rib may be disposed in the first lateral direction with respect to the second movable member. The second rib may protrude from the inner surface of the case. The second rib may be disposed in the second lateral direction with respect to the second movable member. In this case, even if the electromagnetic relay receives a large impact in the lateral direction, displacement of the second movable member is reduced.

In a state in which the first movable member is located in the first open position, the second movable member may be in contact with the auxiliary movable terminal. In this case, when the first movable member starts to move to the first closed position, the movement of the first movable member is assisted by the elastic force of the auxiliary movable terminal. This improves the operating performance of the main contact unit.

The second movable member may include a first contact portion and a second contact portion. The first contact portion may contact the auxiliary movable terminal. The first contact portion may be disposed on an opposite side of the auxiliary fixed contact with respect to the auxiliary movable terminal in the movement direction. The second contact portion may contact the auxiliary movable terminal. The second contact portion may be disposed on the same side as the auxiliary fixed contact with respect to the auxiliary movable terminal in the movement direction. The second contact portion may be offset with respect to the auxiliary moving contact in the lateral direction. In this case, the adhesion of wear powder generated from the second movable member to the auxiliary movable contact is suppressed. This improves the contact stability of the auxiliary movable contact.

The second movable member may further include a third contact portion. The third contact portion may contact the auxiliary movable terminal. The third contact portion may be disposed on the same side as the auxiliary fixed contact with respect to the auxiliary movable terminal in the movement direction. The first contact portion may be disposed between the second contact portion and the third contact portion in the lateral direction. In this case, the auxiliary movable terminal is stably operated by the second movable member.

The electromagnetic relay may further include an insulating wall. The insulating wall may be disposed between the auxiliary contact unit and the coil unit. In this case, the insulation between the auxiliary contact unit and the coil unit is improved.

In a state in which the first movable member is located in the first open position, the second movable member may be located in the second open position. In a state in which the first movable member is located in the first closed position, the second movable member may be located in the second closed position. In this case, the auxiliary movable contact contacts the auxiliary fixed contact while the first movable contact and the second movable contact are in contact with the first fixed contact and the second fixed contact, respectively. Furthermore, in a state in which the first movable contact and the second movable contact are separated from the first fixed contact and the second fixed contact, respectively, the auxiliary movable contact is separated from the auxiliary fixed contact.

In a state in which the first movable member is located in the first open position, the second movable member may be located in the second closed position. In a state in which the first movable member is located in the first closed position, the second movable member may be located in the second open position. In this case, the auxiliary movable contact is separated from the auxiliary fixed contact while the first movable contact and the second movable contact are in contact with the first fixed contact and the second fixed contact, respectively. Furthermore, in a state in which the first movable contact and the second movable contact are separated from the first fixed contact and the second fixed contact, respectively, the auxiliary movable contact contacts the auxiliary fixed contact.

The first fixed terminal, the second fixed terminal, the auxiliary fixed terminal and the auxiliary movable terminal may protrude from the base in the same direction to the outside of the electromagnetic relay. In this case, mounting on a board is easier than when the auxiliary fixed terminal and the auxiliary movable terminal protrude in a direction different from that of the first fixed terminal and the second fixed terminal.

DETAILED DESCRIPTION

Figure 1:
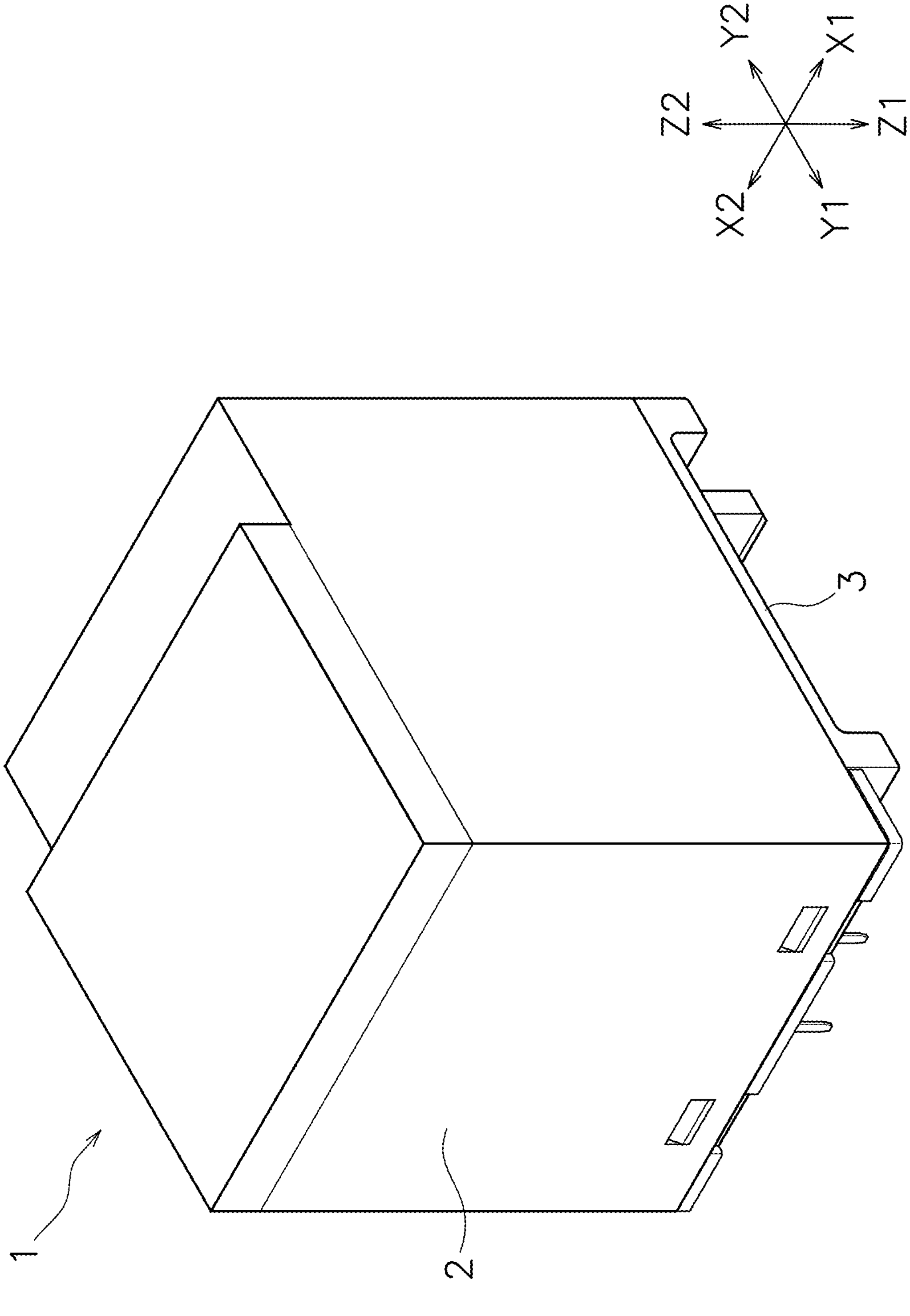
FIG. 1 is a perspective view of an embodiment of an electromagnetic relay in accordance with the claimed invention.
Figure 2:
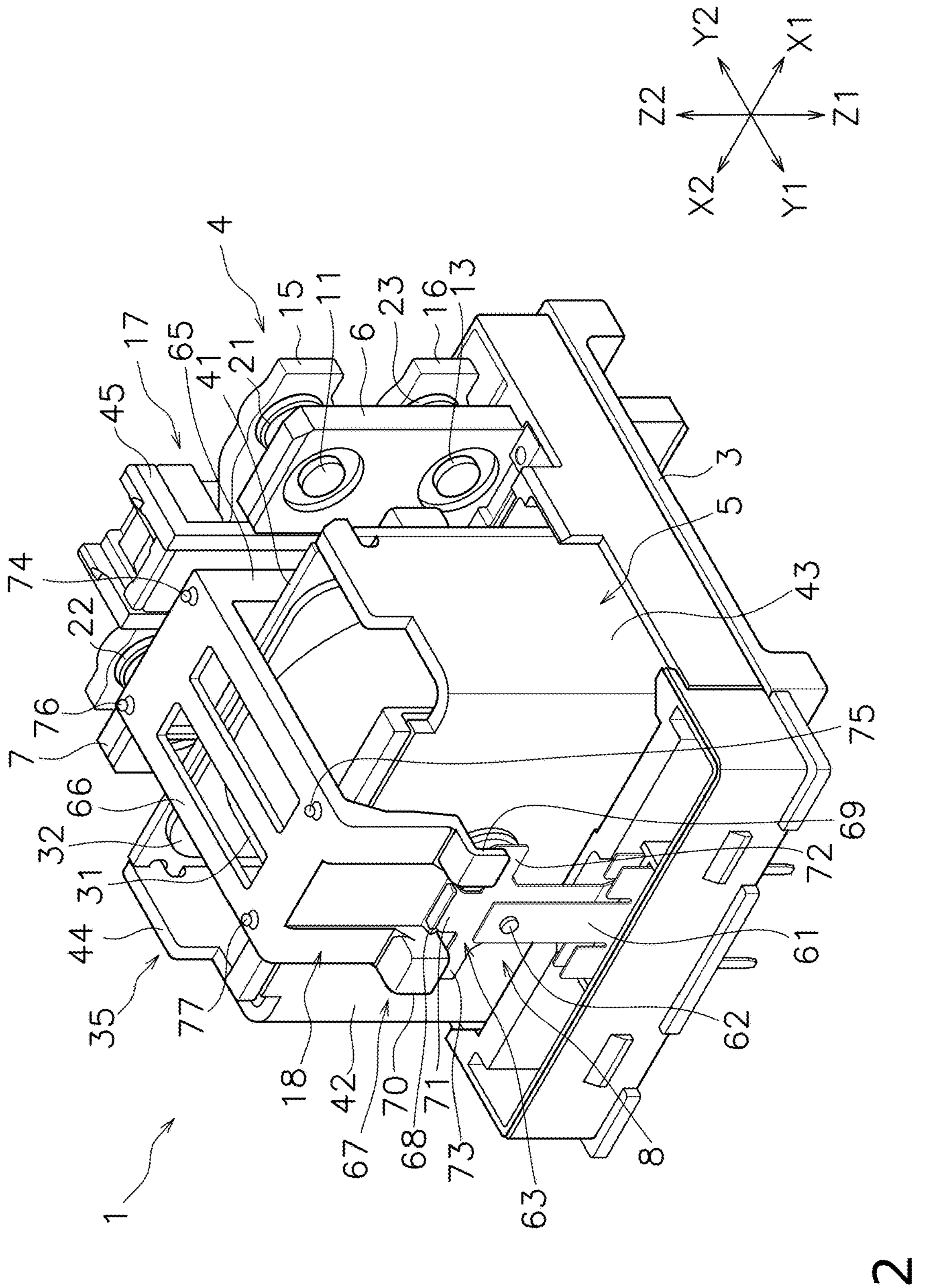
FIG. 2 is a perspective view of the electromagnetic relay.
Figure 7:
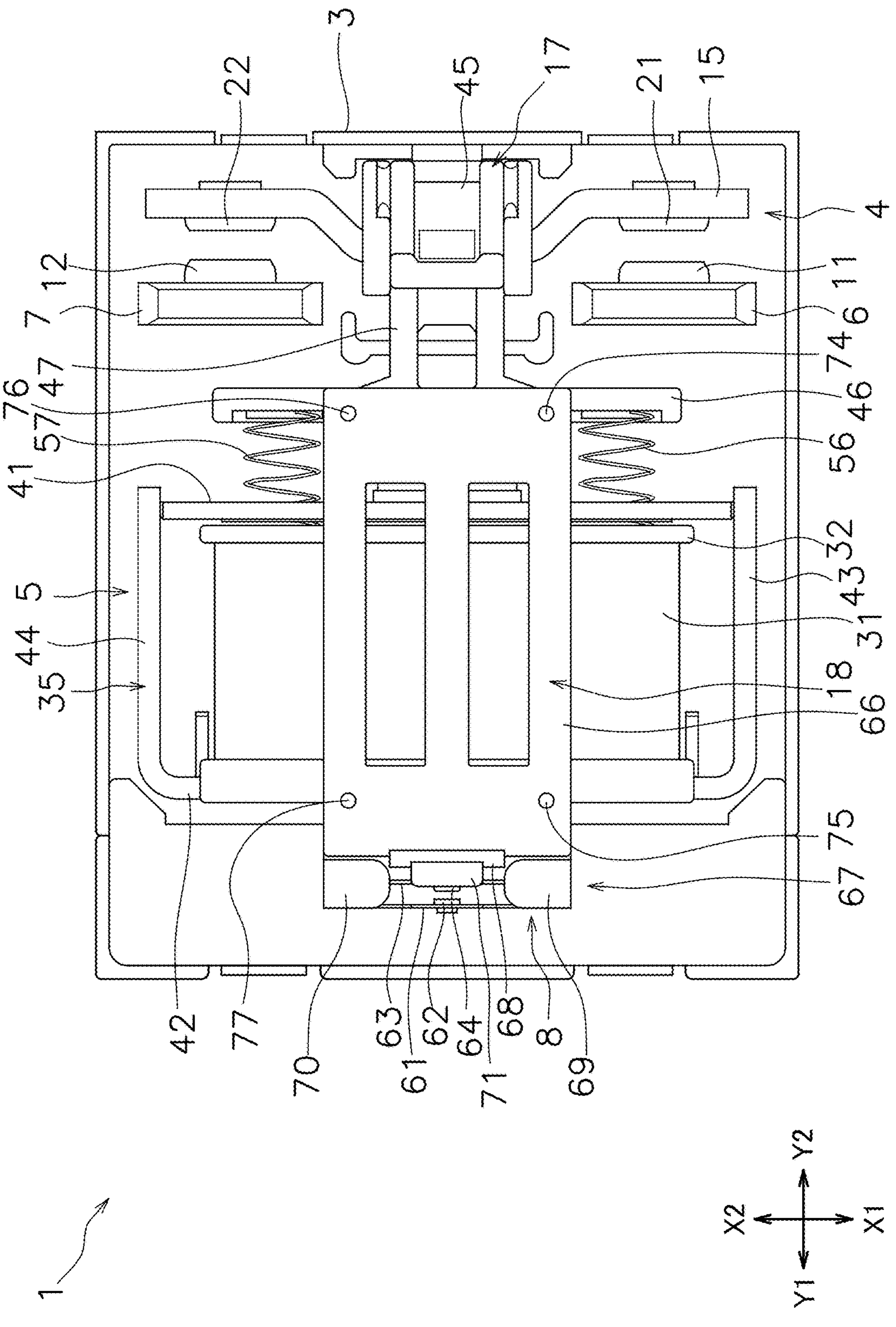
FIG. 7 is a top view of the electromagnetic relay.
Figure 8:
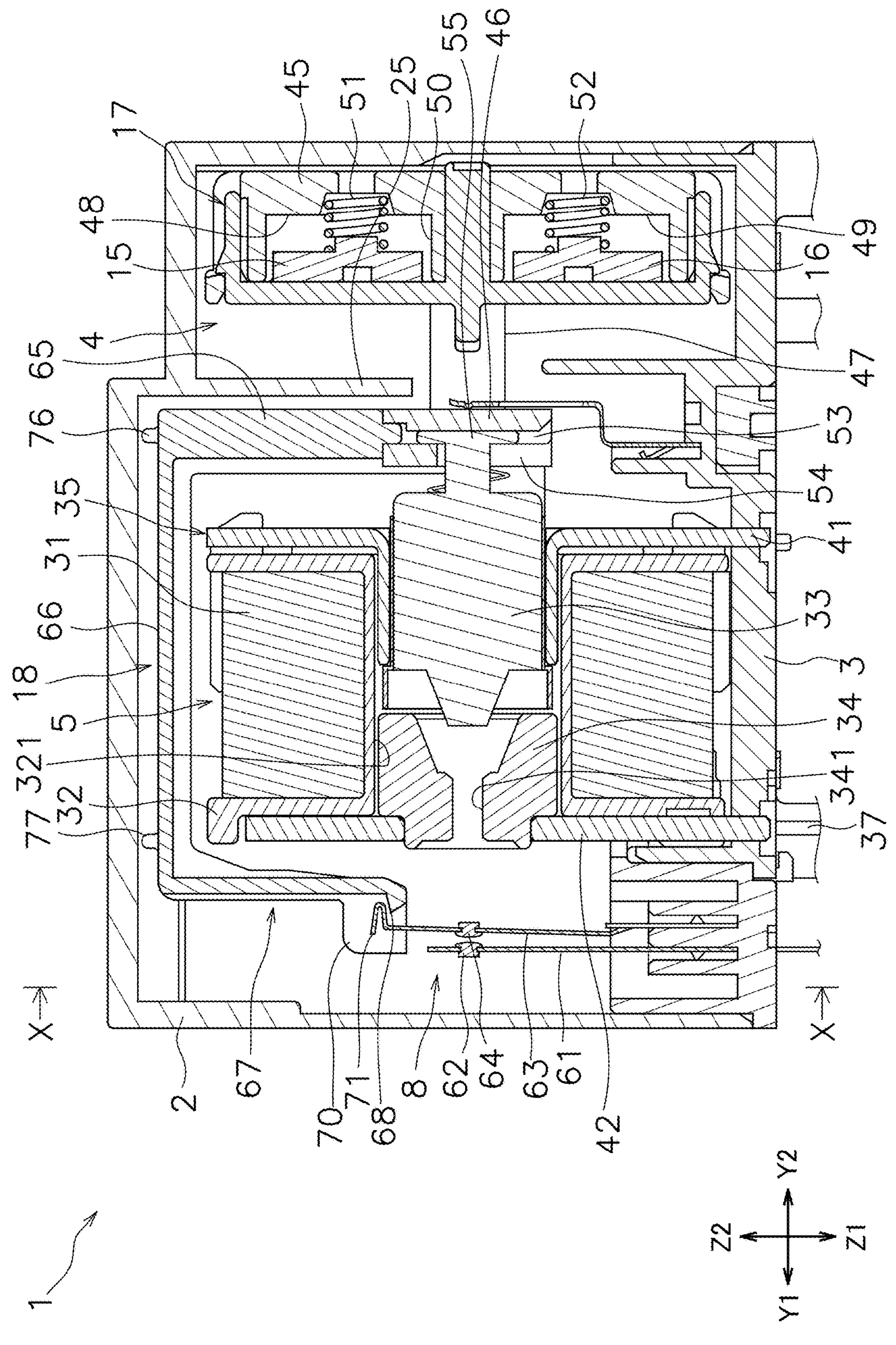
FIG. 8 is a vertical cross-sectional view of the electromagnetic relay.

Hereinafter, an embodiment of an electromagnetic relay in accordance with the claimed invention will be described with reference to the drawings. FIGS. 1 and 2 are perspective views of an electromagnetic relay 1. FIGS. 3 to 6 are side views of the electromagnetic relay 1. FIG. 7 is a top view of the electromagnetic relay 1. FIG. 8 is a vertical cross-sectional view of the electromagnetic relay 1.

As shown in FIGS. 1 to 8, the electromagnetic relay 1 includes a case 2, a base 3, a main contact unit 4, a coil unit 5, a first fixed terminal 6, a second fixed terminal 7, and an auxiliary contact unit 8. It should be noted that the case 2 is omitted in FIGS. 2 to 7.

In this embodiment, the movement direction (Y1, Y2), the support direction (Z1, Z2), and the lateral direction (X1, X2) are defined as follows. The movement direction (Y1, Y2) is a direction in which the main contact unit 4 and the coil unit 5 are aligned with each other. The movement direction (Y1, Y2) includes a first movement direction (Y1) and a second movement direction (Y2). The first movement direction (Y1) is a direction from the main contact unit 4 toward the coil unit 5. The second movement direction (Y2) is opposite to the first movement direction (Y1). The second movement direction (Y2) is a direction from the coil unit 5 toward the main contact unit 4.

The support direction (Z1, Z2) is perpendicular to the movement direction (Y1, Y2). The support direction (Z1, Z2) is a direction in which the base 3 and the main contact unit 4 are aligned with each other. The support direction (Z1, Z2) includes a first support direction (Z1) and a second support direction (Z2). The first support direction (Z1) is a direction from the main contact unit 4 toward the base 3. The second support direction (Z2) is opposite to the first support direction (Z1). The second support direction (Z2) is a direction from the base 3 toward the main contact unit 4. Alternatively, the support direction (Z1, Z2) may be a direction in which the base 3 and the coil unit 5 are aligned with each other.

The lateral direction (X1, X2) is a direction perpendicular to the movement direction (Y1, Y2) and the support direction (Z1, Z2). The lateral direction (X1, X2) includes a first lateral direction (X1) and a second lateral direction (X2). The second lateral direction (X2) is opposite to the first lateral direction (X1).

The case 2 and the base 3 may be made, for example, of resin. The base 3 supports the first fixed terminal 6, the second fixed terminal 7, the main contact unit 4, the coil unit 5, and the auxiliary contact unit 8. The case 2 is attached to the base 3. The case 2 covers the base 3, the main contact unit 4, the coil unit 5, and the auxiliary contact unit 8 from the second support direction (Z2).

The first fixed terminal 6 and the second fixed terminal 7 are made of a conductive material such as copper. The first fixed terminal 6 and the second fixed terminal 7 extend in the support direction (Z1, Z2), respectively. The first fixed terminal 6 and the second fixed terminal 7 are spaced apart from each other in the lateral direction (X1, X2). The first fixed terminal 6 and the second fixed terminal 7 protrude from the base 3 to the outside of the base 3 in the first support direction (Z1).

A first fixed contact 11 and a third fixed contact 13 are connected to the first fixed terminal 6. The first fixed contact 11 and the third fixed contact 13 are spaced apart from each other in the support direction (Z1, Z2) on the first fixed terminal 6. A second fixed contact 12 and a fourth fixed contact 14 are connected to the second fixed terminal 7. The second fixed contact 12 and the fourth fixed contact 14 are spaced apart from each other in the support direction (Z1, Z2) on the second fixed terminal 7. The first to fourth fixed contacts 11-14 are made of a conductive material such as silver or copper.

The main contact unit 4 is supported by the base 3 in the first support direction (Z1). The main contact unit 4 is assembled to the base 3 in the first support direction (Z1). The main contact unit 4 includes a first movable contact piece 15, a second movable contact piece 16, and a first movable member 17. The first movable contact piece 15 and the second movable contact piece 16 extend in the lateral direction (X1, X2). The first movable contact piece 15 and the second movable contact piece 16 are separate bodies from each other. The first movable contact piece 15 and the second movable contact piece 16 are spaced apart from each other in the support direction (Z1, Z2). The second movable contact piece 16 is disposed between the first movable contact piece 15 and the base 3 in the support direction (Z1, Z2). The first movable contact piece 15 and the second movable contact piece 16 are made of a conductive material such as copper.

A first movable contact 21 and a second movable contact 22 are connected to the first movable contact piece 15. The first movable contact 21 and the second movable contact 22 are spaced apart from each other in the lateral direction (X1, X2). The first movable contact 21 is disposed to face the first fixed contact 11. The second movable contact 22 is disposed to face the second fixed contact 12.

A third movable contact 23 and a fourth movable contact 24 are connected to the second movable contact piece 16. The third movable contact 23 and the fourth movable contact 24 are spaced apart from each other in the lateral direction (X1, X2). The third movable contact 23 is disposed to face the third fixed contact 13. The fourth movable contact 24 is disposed to face the fourth fixed contact 14. The first to fourth movable contacts 21-24 are made of a conductive material such as silver or copper.

Figure 3:
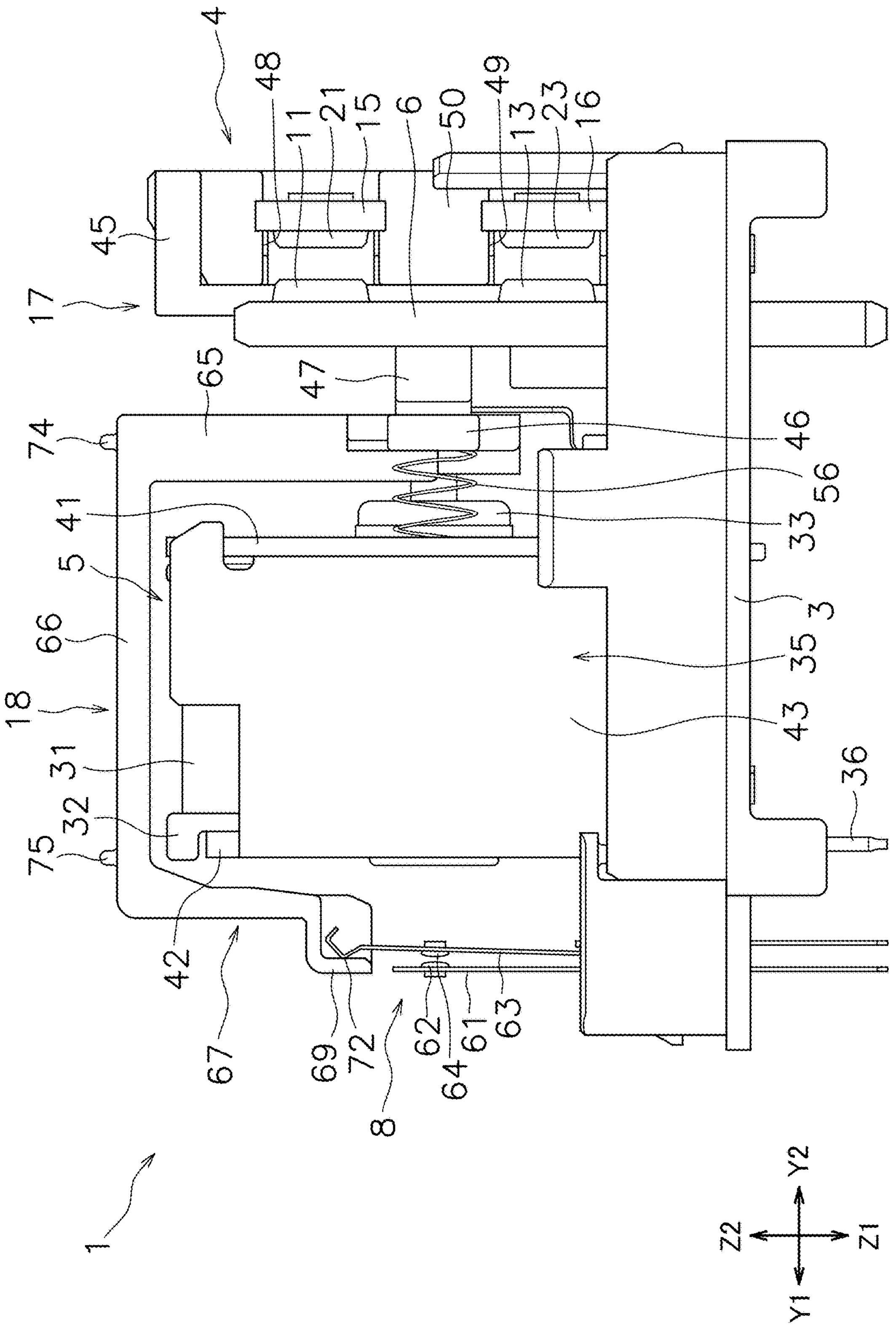
FIG. 3 is a side view of the electromagnetic relay.
Figure 5:
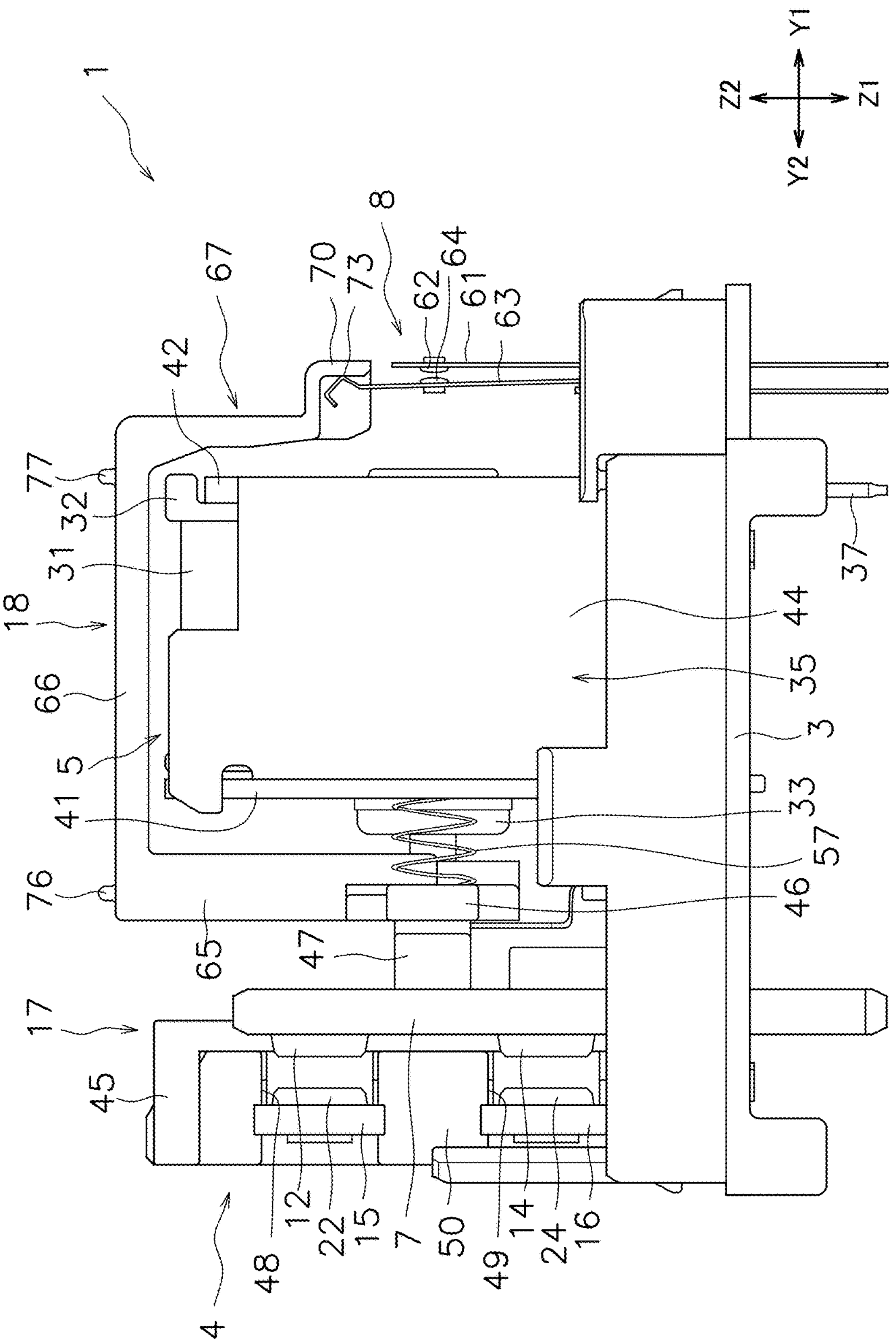
FIG. 5 is a side view of the electromagnetic relay.

The first movable member 17 is connected to the first movable contact piece 15 and the second movable contact piece 16. The first movable member 17 is made of an insulating material such as resin. The first movable member 17 is movable in the movement direction (Y1, Y2) between a first closed position and a first open position. In FIGS. 3, 5 and 7, the first movable member 17 is located in the first open position. In a state in which the first movable member 17 is located in the first open position, the first to fourth movable contacts 21-24 are separated from the first to fourth fixed contacts 11-14, respectively.

Figure 4:
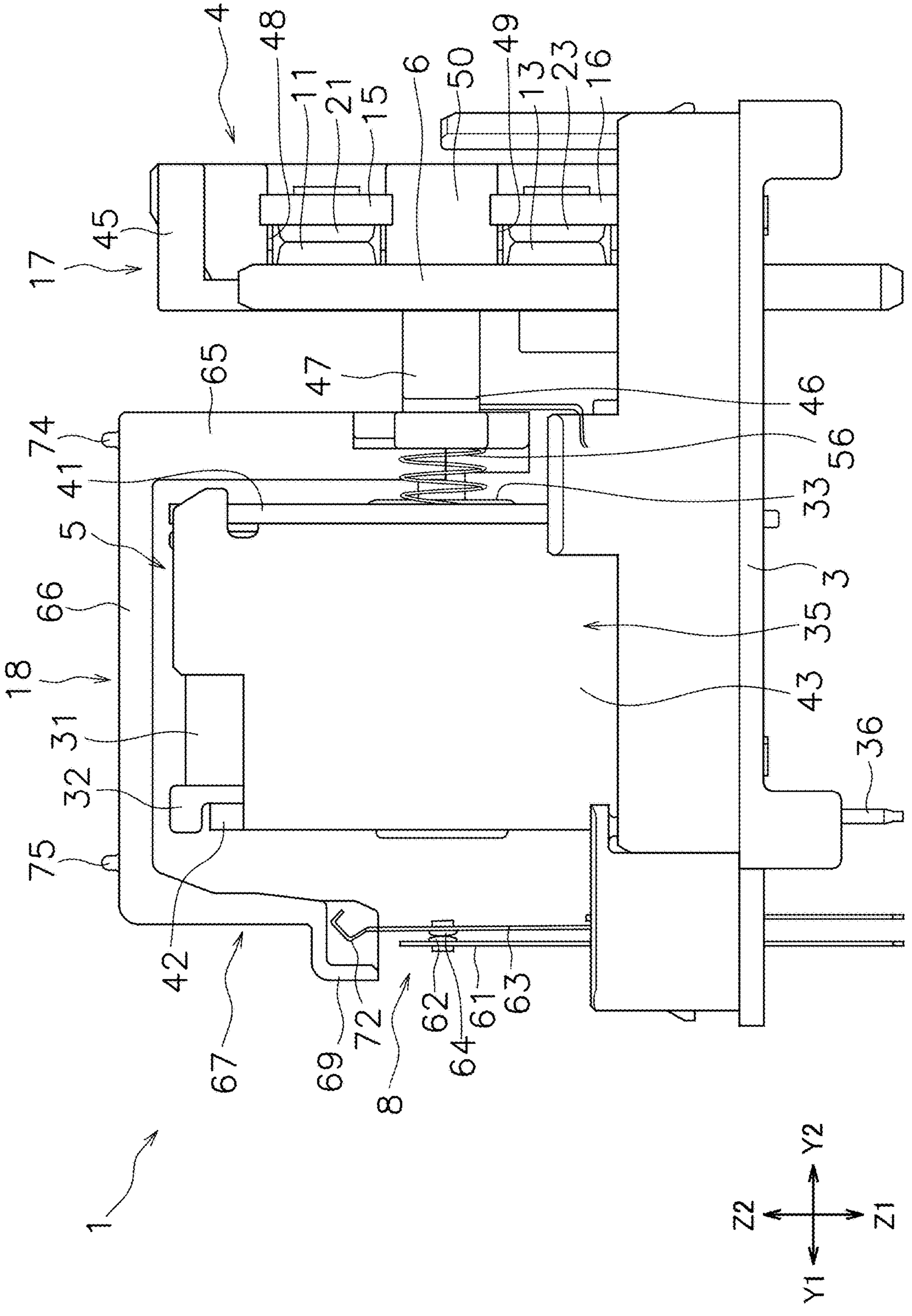
FIG. 4 is a side view of the electromagnetic relay.
Figure 6:
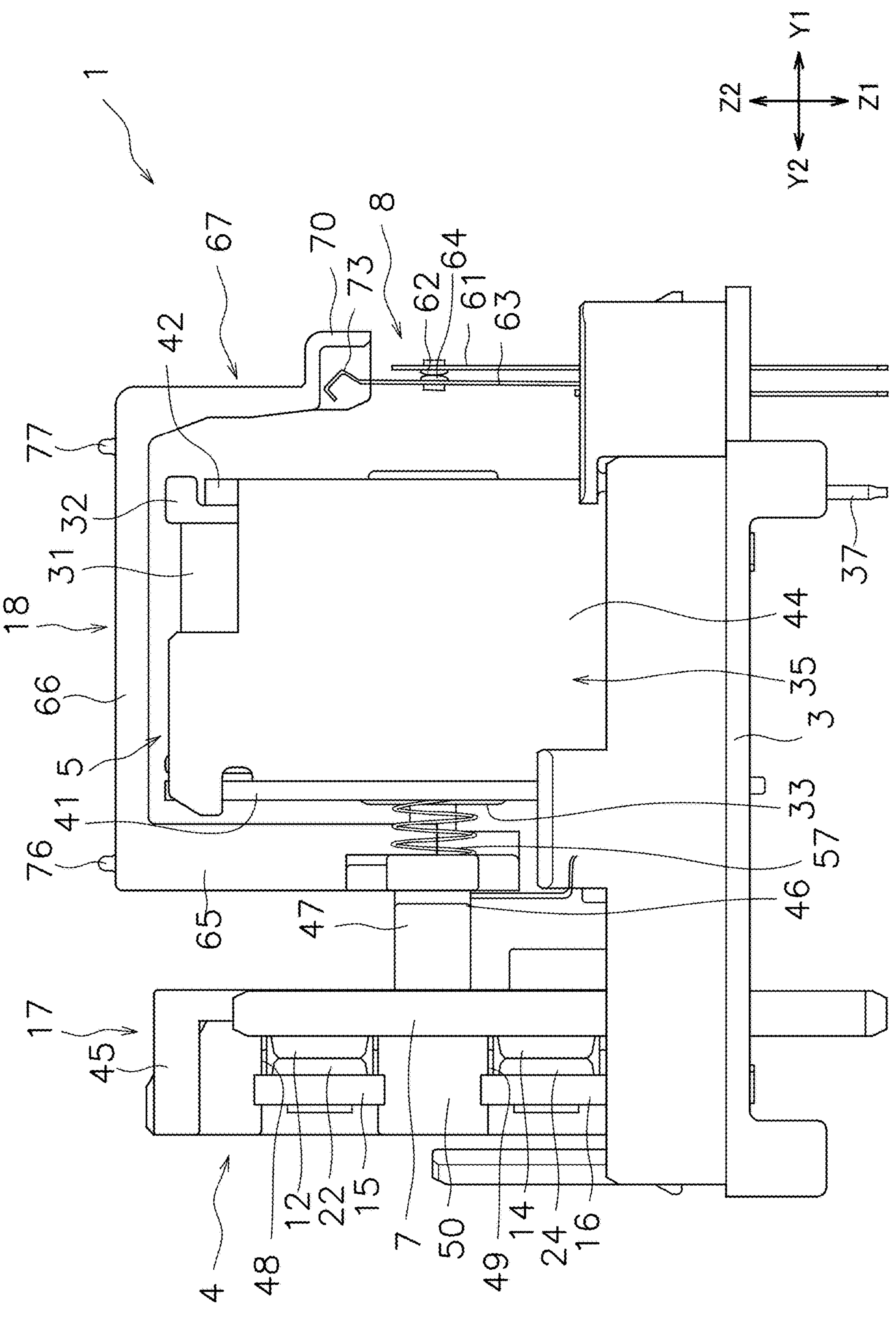
FIG. 6 is a side view of the electromagnetic relay.

In FIGS. 4 and 6, the first movable member 17 is located in the first closed position. In a state in which the first movable member 17 is located in the first closed position, the first to fourth movable contacts 21-24 contact the first to fourth fixed contacts 11-14, respectively. The first movable member 17 moves in the first movement direction (Y1) to move from the first open position to the first closed position. The first movable member 17 moves in the second movement direction (Y2) to move from the first closed position to the first open position.

The coil unit 5 is supported by the base 3 in the first support direction (Z1). The coil unit 5 is assembled to the base 3 in the first support direction (Z1). The coil unit 5 moves the first movable contact piece 15 and the second movable contact piece 16 by electromagnetic force. The coil unit 5 moves the first movable contact piece 15, the second movable contact piece 16, and the first movable member 17 in the first movement direction (Y1) and the second movement direction (Y2). The first movement direction (Y1) is a direction in which the first to fourth movable contacts 21-24 contact the first to fourth fixed contacts 11-14, respectively. The second movement direction (Y2) is a direction in which the first to fourth movable contacts 21-24 move away from the first to fourth fixed contacts 11-14, respectively. The coil unit 5 includes a coil 31, a spool 32, a movable iron core 33, a fixed iron core 34, and a yoke 35.

The coil 31 is wound around the spool 32. The axis of the coil 31 extends in the movement direction (Y1, Y2). The coil 31 is connected to coil terminals 36 and 37. The coil terminals 36 and 37 protrude from the base 3 in the first support direction (Z1). As shown in FIG. 8, the spool 32 includes a hole 321 extending in the movement direction (Y1, Y2). At least a portion of the movable iron core 33 is disposed within the hole 321 of the spool 32. The movable iron core 33 is movable in the first movement direction (Y1) and the second movement direction (Y2).

The fixed iron core 34 is disposed within the hole 321 of the spool 32. The fixed iron core 34 is disposed to face the movable iron core 33 in the movement direction (Y1, Y2). The movable iron core 33 is disposed in the first movement direction (Y1) with respect to the fixed iron core 34. The fixed iron core 34 includes a hole 341 extending in the movement direction (Y1, Y2). When the coil 31 is energized, the coil 31 generates an electromagnetic force that moves the movable iron core 33 in the first movement direction (Y1).

The movable iron core 33 is connected to the first movable member 17. The first movable contact piece 15 and the movable iron core 33 are electrically insulated by the first movable member 17. The second movable contact piece 16 and the movable iron core 33 are electrically insulated by the first movable member 17. The movable iron core 33 moves integrally with the first movable member 17 in the movement direction (Y1, Y2). The movable iron core 33 moves in the first movement direction (Y1) in response to the magnetic force generated by the coil 31. As the movable iron core 33 moves, the first movable member 17 moves to the first closed position. As the first movable member 17 moves, the first movable contact piece 15 and the second movable contact piece 16 move in the first movement direction (Y1) or the second movement direction (Y2).

The yoke 35 is disposed so as to surround the coil 31. The yoke 35 is disposed on a magnetic circuit formed by the coil 31. The yoke 35 includes a first yoke 41, a second yoke 42, a third yoke 43, and a fourth yoke 44. The first yoke 41 and the second yoke 42 extend in the lateral direction (X1, X2) and the support direction (Z1, Z2). The first yoke 41 and the second yoke 42 face the coil 31 in the movement direction (Y1, Y2). The coil 31 is located between the first yoke 41 and the second yoke 42 in the movement direction (Y1, Y2). The first yoke 41 faces the first movable member 17 in the movement direction (Y1, Y2). The second yoke 42 is connected to the fixed iron core 34.

The third yoke 43 and the fourth yoke 44 extend in the movement direction (Y1, Y2) and the support direction (Z1, Z2). The third yoke 43 and the fourth yoke 44 face the coil 31 in the lateral direction (X1, X2). The coil 31 is located between the third yoke 43 and the fourth yoke 44 in the lateral direction (X1, X2).

The first movable member 17 includes a holding portion 45, a first connection portion 46, and a first coupling portion 47. The holding portion 45 supports the first movable contact piece 15 and the second movable contact piece 16. The first connection portion 46 is connected to the movable iron core 33. The first coupling portion 47 is located between the holding portion 45 and the first connection portion 46. The first coupling portion 47 connects the holding portion 45 and the first connection portion 46. The first coupling portion 47 extends in the movement direction (Y1, Y2).

The holding portion 45 extends in the support direction (Z1, Z2). The holding portion 45 is supported by the base 3 in the support direction (Z1, Z2). As the first movable member 17 moves in the movement direction (Y1, Y2), the holding portion 45 slides on the base 3. The holding portion 45 includes a first support hole 48, a second support hole 49, and a partition wall 59. The first movable contact piece 15 is disposed in the first support hole 48. The holding portion 45 holds the first movable contact piece 15 between the first movable contact 21 and the second movable contact 22. The first movable contact piece 15 extends from the holding portion 45 in the first lateral direction (X1) and the second lateral direction (X2).

The second movable contact piece 16 is disposed in the second support hole 49. The holding portion 45 holds the second movable contact piece 16 between the third movable contact 23 and the fourth movable contact 24. The second movable contact piece 16 extends from the holding portion 45 in the first lateral direction (X1) and the second lateral direction (X2). The partition wall 59 separates the first support hole 48 and the second support hole 49. The partition wall 59 is disposed between the first movable contact piece 15 and the second movable contact piece 16 in the support direction (Z1, Z2).

As shown in FIG. 8, the main contact unit 4 includes a first contact spring 51 and a second contact spring 52. The first contact spring 51 is disposed between the first movable contact piece 15 and the holding portion 45. The first contact spring 51 is disposed in the first support hole 48. When the first movable contact 21 is in contact with the first fixed contact 11 and the second movable contact 22 is in contact with the second fixed contact 12, the first contact spring 51 presses the first movable contact piece 15 toward the first fixed terminal 6 and the second fixed terminal 7. The first contact spring 51 may be a coil spring, and is in a natural length state in a state in which the first movable member 17 is located in the first open position.

The second contact spring 52 is disposed between the second movable contact piece 16 and the second holding portion 45. The second contact spring 52 is disposed in the second support hole 49. When the third movable contact 23 is in contact with the third fixed contact 13 and the fourth movable contact 24 is in contact with the fourth fixed contact 14, the second contact spring 52 presses the second movable contact piece 16 toward the first fixed terminal 6 and the second fixed terminal 7. The second contact spring 52 may be a coil spring, and is in a natural length state in a state in which the first movable member 17 is located in the first open position.

The first connection portion 46 is connected to the first coupling portion 47. As shown in FIG. 8, the first connection portion 46 includes a hole 53 and a groove 54. The hole 53 extends in the support direction (Z1, Z2). The groove 54 communicates with the hole 53. The movable iron core 33 includes a head portion 55. The head portion 55 protrudes from the coil unit 5 in the second movement direction (Y2). The head portion 55 is disposed within the hole 53 through the groove 54. As a result, the first movable member 17 is prevented from coming off the movable iron core 33 in the movement direction (Y1, Y2).

The electromagnetic relay 1 includes an insulating wall 25. The insulating wall 25 is disposed between the main contact unit 4 and the coil unit 5 in the movement direction (Y1, Y2). The insulating wall 25 is disposed between the holding portion 45 and the first connection portion 46 in the movement direction (Y1, Y2). The insulating wall 25 extends from the top surface of the case 2 in the first support direction (Z1).

As shown in FIG. 7, the electromagnetic relay 1 includes a first return spring 56 and a second return spring 57. The first return spring 56 and the second return spring 57 are disposed between the first movable member 17 and the coil unit 5. The first return spring 56 and the second return spring 57 are attached to the first connection portion 46. The first return spring 56 and the second return spring 57 are disposed apart from each other in the lateral direction (X1, X2). The first return spring 56 and the second return spring 57 bias the first movable member 17 in the second movement direction (Y2).

The auxiliary contact unit 8 is supported by the base 3 in the first support direction (Z1). The auxiliary contact unit 8 is assembled to the base 3 in the first support direction (Z1). The auxiliary contact unit 8 is disposed on the opposite side of the main contact unit 4 with respect to the coil unit 5 in the movement direction (Y1, Y2). The auxiliary contact unit 8 is disposed in the first movement direction (Y1) with respect to the coil unit 5. The coil unit 5 is disposed between the main contact unit 4 and the auxiliary contact unit 8 in the movement direction (Y1, Y2). The auxiliary contact unit 8 includes an auxiliary fixed terminal 61, an auxiliary fixed contact 62, an auxiliary movable terminal 63, and an auxiliary movable contact 64.

The auxiliary fixed terminal 61 and the auxiliary movable terminal 63 are made of a conductive material such as copper. The auxiliary fixed terminal 61 and the auxiliary movable terminal 63 are supported by the base 3. The auxiliary fixed terminal 61 and the auxiliary movable terminal 63 extend in the support direction (Z1, Z2), respectively. The auxiliary fixed terminal 61 and the auxiliary movable terminal 63 protrude from the base 3 to the outside of the base 3 in the first support direction (Z1). That is, the first fixed terminal 6, the second fixed terminal 7, the auxiliary fixed terminal 61, and the auxiliary movable terminal 63 protrude from the base 3 in the same direction to the outside of the electromagnetic relay 1.

The auxiliary fixed terminal 61 and the auxiliary movable terminal 63 are spaced apart from each other in the movement direction (Y1, Y2). The auxiliary fixed terminal 61 is electrically insulated from the first fixed terminal 6, the second fixed terminal 7, the first movable contact piece 15, and the second movable contact piece 16. The auxiliary movable terminal 63 is electrically insulated from the first fixed terminal 6, the second fixed terminal 7, the first movable contact piece 15, and the second movable contact piece 16. The auxiliary movable terminal 63 is disposed in the second movement direction (Y2) with respect to the auxiliary fixed terminal 61.

The auxiliary fixed contact 62 and the auxiliary movable contact 64 are made of a conductive material such as silver or copper. The auxiliary fixed contact 62 is connected to the auxiliary fixed terminal 61. The auxiliary movable contact 64 is connected to the auxiliary movable terminal 63. The auxiliary fixed contact 62 and the auxiliary movable contact 64 are disposed facing each other in the movement direction (Y1, Y2).

The electromagnetic relay 1 includes a second movable member 18. The second movable member 18 is made of an insulating material such as resin. The second movable member 18 is connected to the first movable member 17. The second movable member 18 extends from the main contact unit 4 through a position located in the second support direction (Z2) with respect to the coil unit 5 to the auxiliary contact unit 8. The second movable member 18 moves in the movement direction (Y1, Y2) in conjunction with the first movable member 17. The second movable member 18 moves integrally with the first movable member 17. In response to the movement of the second movable member 18, the auxiliary movable terminal 63 moves in the movement direction (Y1, Y2). This causes the auxiliary movable contact 64 to move in the movement direction (Y1, Y2).

The second movable member 18 is movable between a second closed position and a second open position. In FIGS. 3, 5 and 7, the second movable member 18 is located in the second open position. In a state in which the first movable member 17 is located in the first open position, the second movable member 18 is located in the second open position. In a state in which the second movable member 18 is located in the second open position, the second movable member 18 presses the auxiliary movable terminal 63 in the second movement direction (Y2) and the auxiliary movable contact 64 is separated from the auxiliary fixed contact 62.

In FIGS. 4 and 6, the second movable member 18 is located in the second closed position. In a state in which the first movable member 17 is located in the first closed position, the second movable member 18 is located in the second closed position. In a state in which the second movable member 18 is located in the second closed position, the second movable member 18 presses the auxiliary movable terminal 63 in the first movement direction (Y1) and the auxiliary movable contact 64 contacts the auxiliary fixed contact 62.

Figure 9:
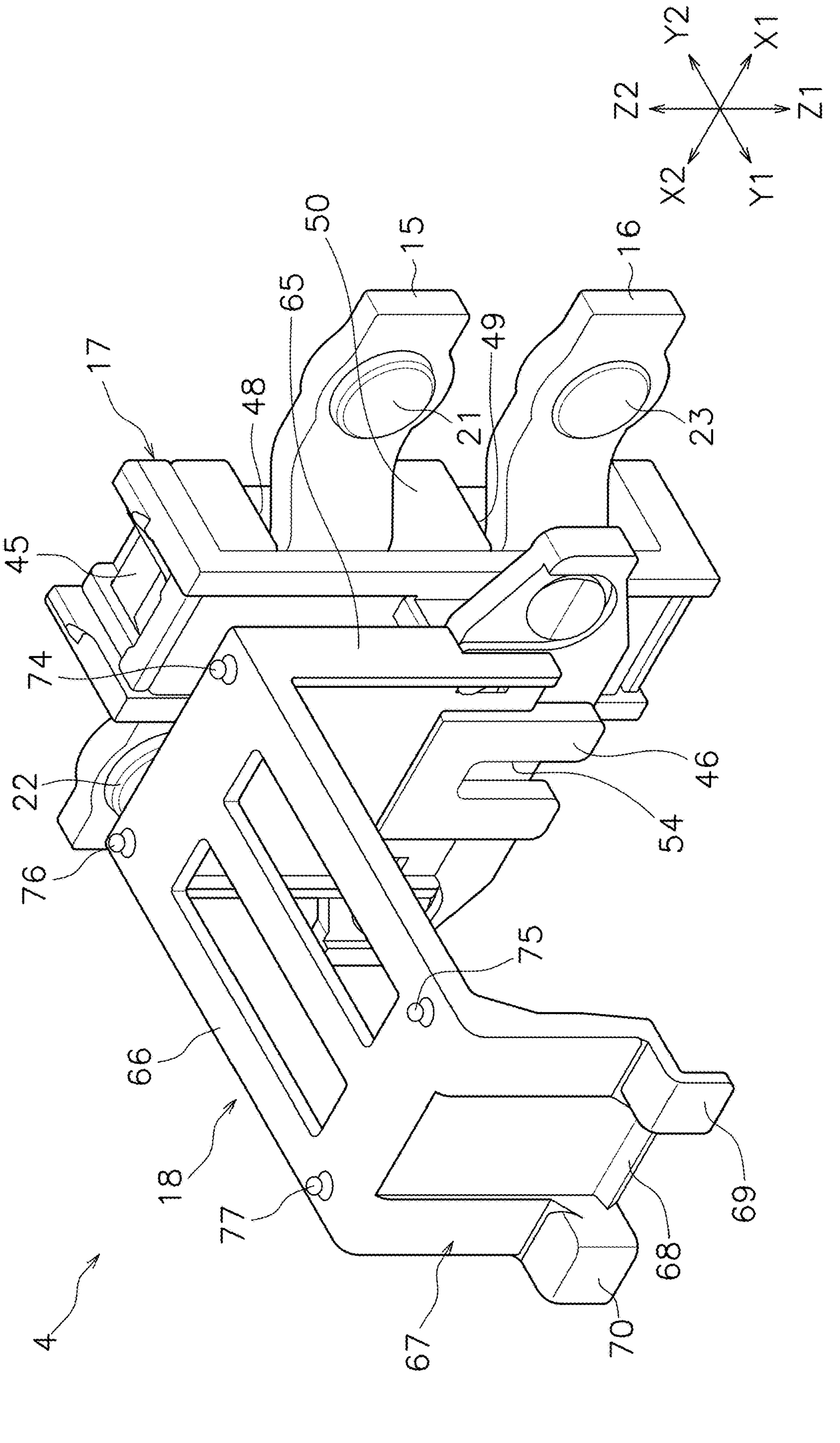
FIG. 9 is a perspective view of a main contact unit and a second movable member.

FIG. 9 is a perspective view of the main contact unit 4 and the second movable member 18. As shown in FIGS. 1 to 9, the second movable member 18 includes a second connection portion 65, a second coupling portion 66, and a contact portion 67. The second connection portion 65 is connected to the first movable member 17. The second connection portion 65 is disposed in the second movement direction (Y2) with respect to the coil unit 5. The second connection portion 65 is connected to the first connection portion 46. The second connection portion 65 extends from the first connection portion 46 in the second support direction (Z2). The second coupling portion 66 couples the second connection portion 65 and the contact portion 67. The second coupling portion 66 is disposed in the second support direction (Z2) with respect to the coil unit 5. The second coupling portion 66 extends in the movement direction (Y1, Y2). The second coupling portion 66 extends from the second connection portion 65 in the first movement direction (Y1).

Figure 10:
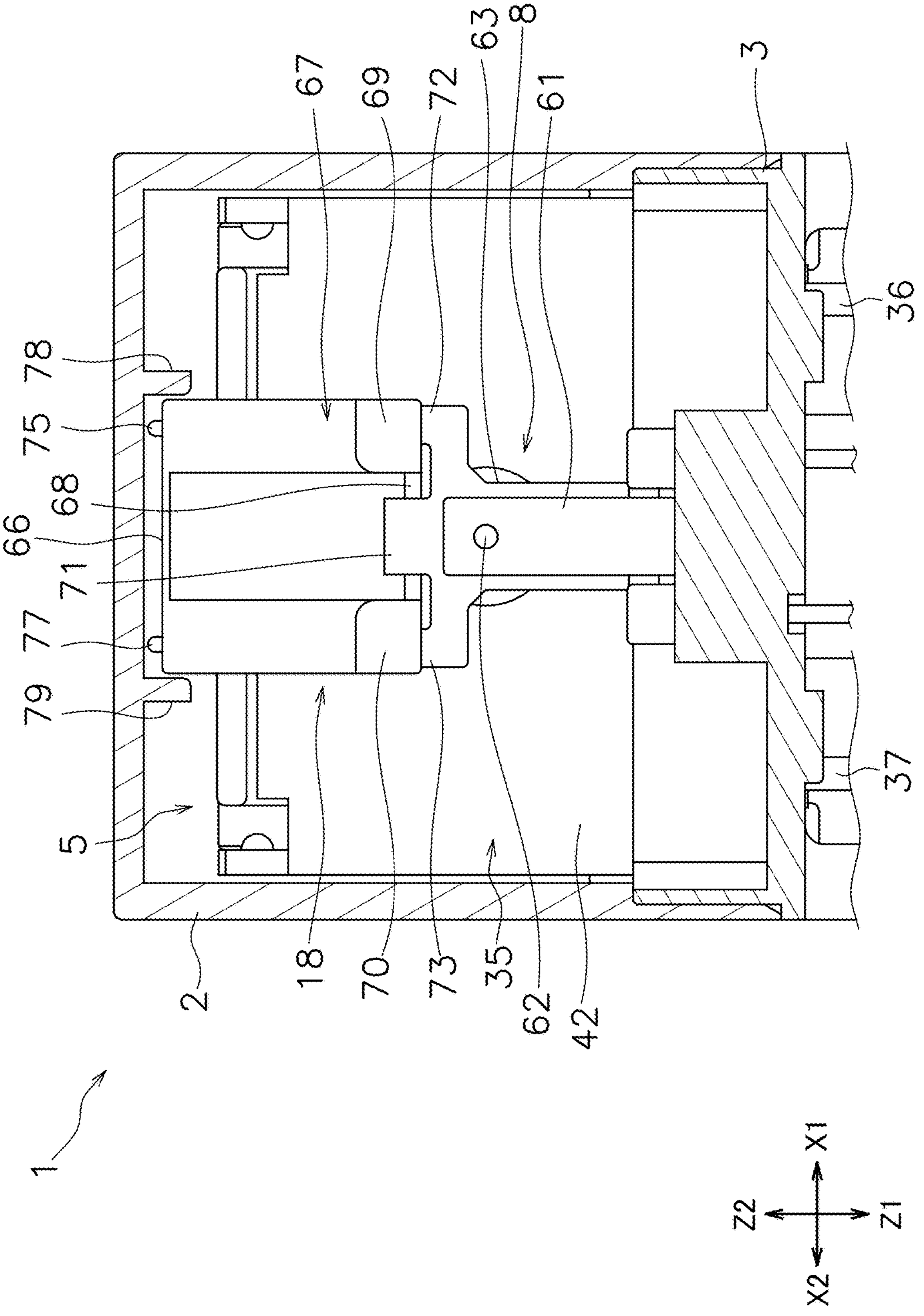
FIG. 10 is a cross-sectional view taken along line X-X in FIG. 8.

The contact portion 67 is disposed in the first movement direction (Y1) with respect to the coil unit 5. The contact portion 67 contacts the auxiliary movable terminal 63. The contact portion 67 extends from the second coupling portion 66 in the first support direction (Z1). The contact portion 67 includes a first contact portion 68, a second contact portion 69, and a third contact portion 70. FIG. 10 is a cross-sectional view taken along line X-X in FIG. 8. As shown in FIG. 10, the auxiliary movable terminal 63 includes a first receiving portion 71, a second receiving portion 72, and a third receiving portion 73. The auxiliary movable terminal 63 has a tip end divided into the first receiving portion 71, the second receiving portion 72, and the third receiving portion 73. The first receiving portion 71 is disposed between the second receiving portion 72 and the third receiving portion 73 in the lateral direction (X1, X2). The second receiving portion 72 is disposed in the first lateral direction (X1) with respect to the first receiving portion 71. The third receiving portion 73 is disposed in the second lateral direction (X2) with respect to the first receiving portion 71.

The first contact portion 68 is disposed between the second contact portion 69 and the third contact portion 70 in the lateral direction (X1, X2). The first contact portion 68 is disposed on the opposite side of the auxiliary fixed contact 62 with respect to the auxiliary movable terminal 63 in the movement direction (Y1, Y2). The first contact portion 68 is disposed in the second movement direction (Y2) with respect to the auxiliary movable terminal 63. The first contact portion 68 is disposed to face the first receiving portion 71. As the second movable member 18 moves in the first movement direction (Y1), the first contact portion 68 contacts the first receiving portion 71 to press the auxiliary movable terminal 63 in the first movement direction (Y1). Thereby, as shown in FIGS. 4 and 6, the auxiliary movable terminal 63 moves to the second closed position and the auxiliary movable contact 64 contacts the auxiliary fixed contact 62.

The second contact portion 69 and the third contact portion 70 are disposed on the same side as the auxiliary fixed contact 62 with respect to the auxiliary movable terminal 63 in the movement direction (Y1, Y2). The second contact portion 69 and the third contact portion 70 are disposed in the first movement direction (Y1) with respect to the auxiliary movable terminal 63. The second contact portion 69 is disposed to face the second receiving portion 72. The third contact portion 70 is disposed to face the third receiving portion 73. As the second movable member 18 moves in the second movement direction (Y2), the second contact portion 69 contacts the second receiving portion 72 and the third contact portion 70 contacts the third receiving portion 73 so that the second contact portion 69 and the third contact portion 70 press the auxiliary movable terminal 63 in the second movement direction (Y2). Thereby, as shown in FIGS. 3, 5 and 7, the auxiliary movable terminal 63 moves to the second open position and the auxiliary movable contact 64 separates from the auxiliary fixed contact 62.

The second contact portion 69 and the third contact portion 70 are disposed offset in the lateral direction (X1, X2) with respect to the auxiliary movable contact 64. The second contact portion 69 is disposed offset in the first lateral direction (X1) with respect to the auxiliary movable contact 64. The third contact portion 70 is disposed offset in the second lateral direction (X2) with respect to the auxiliary movable contact 64. This makes it difficult for wear powder generated when the second contact portion 69 and the third contact portion 70 contact the auxiliary movable terminal 63 to adhere to the auxiliary movable contact 64.

The second contact portion 69 has a shape that covers the second receiving portion 72 from the auxiliary movable contact 64 side in the movement direction (Y1, Y2) and covers the second receiving portion 72 from the first receiving portion 71 side in the lateral direction (X1, X2). The third contact portion 70 has a shape that covers the third receiving portion 73 from the auxiliary movable contact 64 side in the movement direction (Y1, Y2) and covers the second receiving portion 72 from the first receiving portion 71 side in the lateral direction (X1, X2). This makes it difficult for wear powder generated when the second contact portion 69 and the third contact portion 70 contact the auxiliary movable terminal 63 to adhere to the auxiliary movable contact 64.

As shown in FIGS. 8 to 10, the second movable member 18 includes protrusions 74-77. The protrusions 74-77 protrude from the second coupling portion 66 towards the case 2. The protrusions 74-77 ensure a gap between the second movable member 18 and the inner surface of the case 2. This allows the second movable member 18 to move stably even if the case 2 is deformed.

As shown in FIG. 10, the case 2 includes a first rib 78 and a second rib 79. The first rib 78 and the second rib 79 protrude from the inner surface of the case 2. The first rib 78 is disposed in the first lateral direction (X1) with respect to the second movable member 18. The second rib 79 is disposed in the second lateral direction (X2) with respect to the second movable member 18. Even if the electromagnetic relay 1 receives a large impact in the lateral direction (X1, X2), the first rib 78 and the second rib 79 prevent the second movable member 18 from shifting.

Next, the operation of the electromagnetic relay 1 will be described. In a case that the coil 31 is not energized, the coil unit 5 is not excited. In this case, the first movable member 17, together with the movable iron core 33, is pressed in the second movement direction (Y2) by the elastic force of the return springs 56 and 57, and the first movable member 17 is located in the first open position shown in FIGS. 3 and 5. In this state, the first movable contact piece 15 and the second movable contact piece 16 are also pressed in the second movement direction (Y2) via the first movable member 17. Therefore, in a state in which the first movable member 17 is located in the first open position, the first movable contact 21 and the second movable contact 22 are separated from the first fixed contact 11 and the second fixed contact 12. Similarly, in a state in which the first movable member 17 is located in the first open position, the third movable contact 23 and the fourth movable contact 24 are separated from the third fixed contact 13 and the fourth fixed contact 14.

Additionally, the second movable member 18 is located in the second open position. In this state, the second receiving portion 72 of the auxiliary movable terminal 63 is pressed in the second movement direction (Y2) by the second contact portion 69 of the second movable member 18 and the third receiving portion 73 of the auxiliary movable terminal 63 is pressed in the second movement direction (Y2) by the third contact portion 70 of the second movable member 18. Therefore, in a state in which the first movable member 17 is located in the first open position, the auxiliary movable contact 64 is separated from the auxiliary fixed contact 62. The auxiliary movable terminal 63 is elastically deformed by being pressed in the second movement direction (Y2) by the second movable member 18. Therefore, the second movable member 18 is biased in the first movement direction (Y1) by the elastic force of the auxiliary movable terminal 63. However, the elastic force of the auxiliary movable terminal 63 is smaller than the elastic force of the return springs 56 and 57. Therefore, the first movable member 17 is held in the first open position and the second movable member 18 is held in the second open position.

When the coil 31 is energized, the coil unit 5 is excited. In this case, the electromagnetic force of the coil 31 causes the movable iron core 33 to move in the first movement direction (Y1) against the elastic forces of the return springs 56 and 57. As a result, the first movable member 17, the first movable contact piece 15, and the second movable contact piece 16 move in the first movement direction (Y1). Therefore, as shown in FIGS. 4 and 6, the first movable member 17 moves to the first closed position. As a result, in a state in which the first movable member 17 is located in the first closed position, the first movable contact 21 and the second movable contact 22 contact the first fixed contact 11 and the second fixed contact 12, respectively. Similarly, in a state in which the first movable member 17 is located in the first closed position, the third movable contact 23 and the fourth movable contact 24 contact the third fixed contact 13 and the fourth fixed contact 14, respectively. As a result, the first movable contact piece 15 and the second movable contact piece 16 are electrically connected to the first fixed terminal 6 and the second fixed terminal 7.

Additionally, the second movable member 18 moves together with the first movable member 17 in the first movement direction (Y1). Thereby, the second movable member 18 moves to the second closed position. In this state, the first receiving portion 71 of the auxiliary movable terminal 63 is pressed in the first movement direction (Y1) by the first contact portion 68 of the second movable member 18. Therefore, in a state in which the first movable member 17 is located in the first closed position, the auxiliary movable contact 64 contacts the auxiliary fixed contact 62. As a result, the auxiliary movable terminal 63 is electrically connected to the auxiliary fixed terminal 61. It should be noted that the first contact portion 68 presses the first receiving portion 71 and the auxiliary movable contact 64 contacts the auxiliary fixed contact 62 before the first to fourth movable contacts 21-24 contact the first to fourth fixed contacts 11-14, respectively.

When the current to the coil 31 is stopped and the coil 31 is demagnetized, the movable iron core 33 is pressed in the second movement direction (Y2) by the elastic forces of the return springs 56 and 57. As a result, the first movable member 17, the first movable contact piece 15, and the second movable contact piece 16 move in the second movement direction (Y2). Therefore, as shown in FIGS. 3 and 5, the first movable member 17 moves to the first open position. As a result, in a state in which the first movable member 17 is located in the first open position, the first movable contact 21 and the second movable contact 22 are separated from the first fixed contact 11 and the second fixed contact 12. Similarly, in a state in which the first movable member 17 is located in the first open position, the third movable contact 23 and the fourth movable contact 24 are separated from the third fixed contact 13 and the fourth fixed contact 14. In addition, the second movable member 18 moves together with the first movable member 17 in the second movement direction (Y2). Thereby, the second movable member 18 moves to the second open position. Therefore, in a state in which the first movable member 17 is located in the first open position, the auxiliary movable contact 64 is separated from the auxiliary fixed contact 62.

In the electromagnetic relay 1 described above, the main contact unit 4 and the coil unit 5 are supported by the base 3 in the first support direction (Z1). The first support direction (Z1) is perpendicular to the movement direction (Y1, Y2) of the first movable member 17. Therefore, the influence of assembly accuracy on the operations of the main contact unit 4 and the auxiliary contact unit 8 is reduced. The auxiliary contact unit 8 is disposed on the opposite side of the coil unit 5 from the main contact unit 4 in the movement direction (Y1, Y2) of the first movable member 17. This reduces the effect on the auxiliary contact unit 8 of the opening and closing of the contacts in the main contact unit 4, and also prevents the electromagnetic relay 1 from becoming large.

Although one embodiment of the claimed invention has been described above, the claimed invention is not limited to the above embodiment, and various modifications are possible without departing from the scope of the invention.

In the above embodiment, when the coil unit 5 pushes out the first movable member 17 in the second movement direction (Y2), the first to fourth movable contacts 21-24 are separated from the first to fourth fixed contacts 11-14. Furthermore, when the coil unit 5 pulls the first movable member 17 in the first movement direction (Y1), the first to fourth movable contacts 21-24 contact the first to fourth fixed contacts 11-14. However, the movement direction of the first movable member 17 for opening and closing the contacts may be opposite to that in the above embodiment. In other words, the coil unit 5 may push the first movable member 17 in the second movement direction (Y2) to cause the first to fourth movable contacts 21-24 to contact the first to fourth fixed contacts 11-14. The coil unit 5 may pull the first movable member 17 in the first movement direction (Y1) to cause the first to fourth movable contacts 21-24 to separate from the first to fourth fixed contacts 11-14.

The shapes or arrangements of the first fixed terminal 6, the second fixed terminal 7, the first movable contact piece 15, and the second movable contact piece 16 may be changed. For example, the first fixed terminal 6 and the second fixed terminal 7 may protrude from the base 3 in a direction different from that in the above embodiment. The first movable contact piece 15 and the second movable contact piece 16 may be integral with each other. That is, the first to fourth movable contacts 21-24 may be connected to a single movable contact piece. Alternatively, the second movable contact piece 16, the third and fourth movable contacts 23 and 24, and the third and fourth fixed contacts 13 and 14 may be omitted.

The shapes or arrangements of the coil 31, the spool 32, the movable iron core 33, the fixed iron core 34, or the yoke 35 may be changed. The shape or arrangement of the first to fourth fixed contacts 11-14 may be changed. The shapes or arrangements of the first to fourth movable contacts 21-24 may be changed.

The first fixed contact 11 and/or the third fixed contact 13 may be integral with the first fixed terminal 6. The first fixed contact 11 and/or the third fixed contact 13 may be part of the first fixed terminal 6 and may be flush with other parts of the first fixed terminal 6. The second fixed contact 12 and/or the fourth fixed contact 14 may be integral with the second fixed terminal 7. The second fixed contact 12 and/or the fourth fixed contact 14 may be part of the second fixed terminal 7 and may be flush with other parts of the second fixed terminal 7.

The first movable contact 21 and/or the second movable contact 22 may be integral with the first movable contact piece 15. The first movable contact 21 and/or the second movable contact 22 may be part of the first movable contact piece 15 and may be flush with other parts of the first movable contact piece 15. The third movable contact 23 and/or the fourth movable contact 24 may be integral with the second movable contact piece 16. The third movable contact 23 and/or the fourth movable contact 24 may be part of the second movable contact piece 16 and may be flush with other parts of the second movable contact piece 16.

The shape or arrangement of the first movable member 17 may be changed. For example, the first movable member 17 may include a shaft member that connects the movable contact pieces 15 and 16 and the movable iron core 33. The first movable member 17 may be made of an electrically conductive material. The first movable member 17 may be made of metal.

The configuration of the auxiliary contact unit 8 is not limited to that in the above embodiment and may be modified. For example, the auxiliary fixed contact 62 may be integrated with the auxiliary fixed terminal 61. The auxiliary fixed contact 62 may be a part of the auxiliary fixed terminal 61 and may be flush with the other parts of the auxiliary fixed terminal 61. The auxiliary movable contact 64 may be integral with the auxiliary movable terminal 63. The auxiliary movable contact 64 may be a part of the auxiliary movable terminal 63 and may be flush with other parts of the auxiliary movable terminal 63.

The shapes or arrangements of the auxiliary fixed terminal 61, the auxiliary movable terminal 63, and the second movable member 18 may be changed. For example, the auxiliary fixed terminal 61 and the auxiliary movable terminal 63 may protrude from the base 3 in a direction different from that in the above embodiment. Alternatively, the auxiliary fixed terminal 61 and the auxiliary movable terminal 63 may protrude from the case 2 to the outside of the electromagnetic relay 1.

Figure 11:
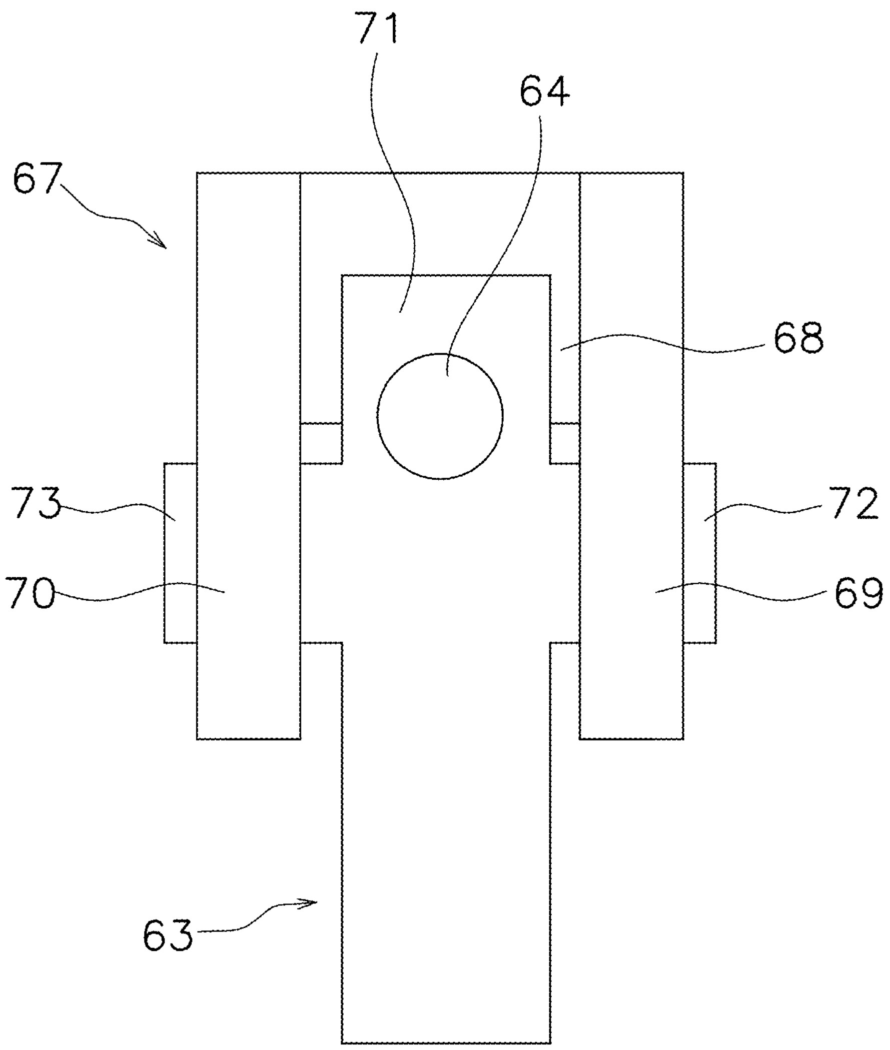
FIG. 11 is a front view showing a contact portion and an auxiliary movable terminal according to a first modified embodiment of the claimed invention.
Figure 12:
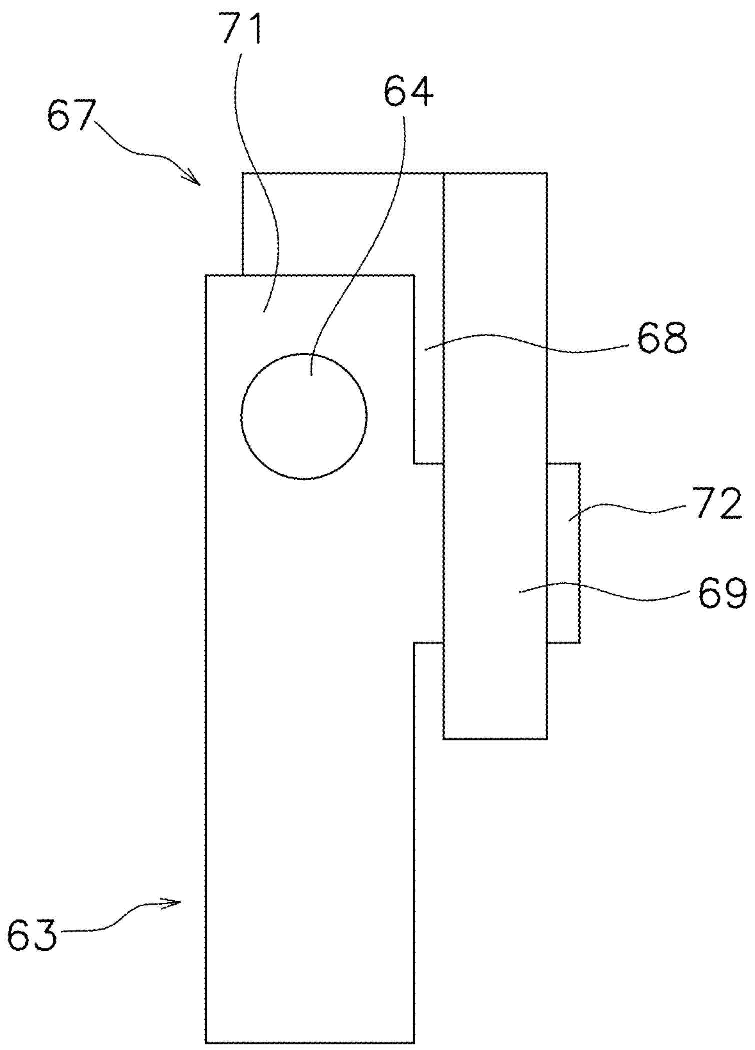
FIG. 12 is a front view showing a contact portion and an auxiliary movable terminal according to a second modified embodiment of the claimed invention.

The shape or arrangement of the contact portion 67 of the second movable member 18 and the auxiliary movable terminal 63 may be changed. For example, FIG. 11 is a front view showing a contact portion 67 and an auxiliary movable terminal 63 according to a first modified embodiment. As shown in FIG. 11, the auxiliary movable terminal 63 may have a cross shape. The auxiliary movable contact 64 may be provided on the first receiving portion 71. FIG. 12 is a front view showing a contact portion 67 and an auxiliary movable terminal 63 according to a second modified embodiment. As shown in FIG. 12, the third contact portion 70 of the second movable member 18 and the third receiving portion 73 of the auxiliary movable terminal 63 may be omitted.

Figure 13:
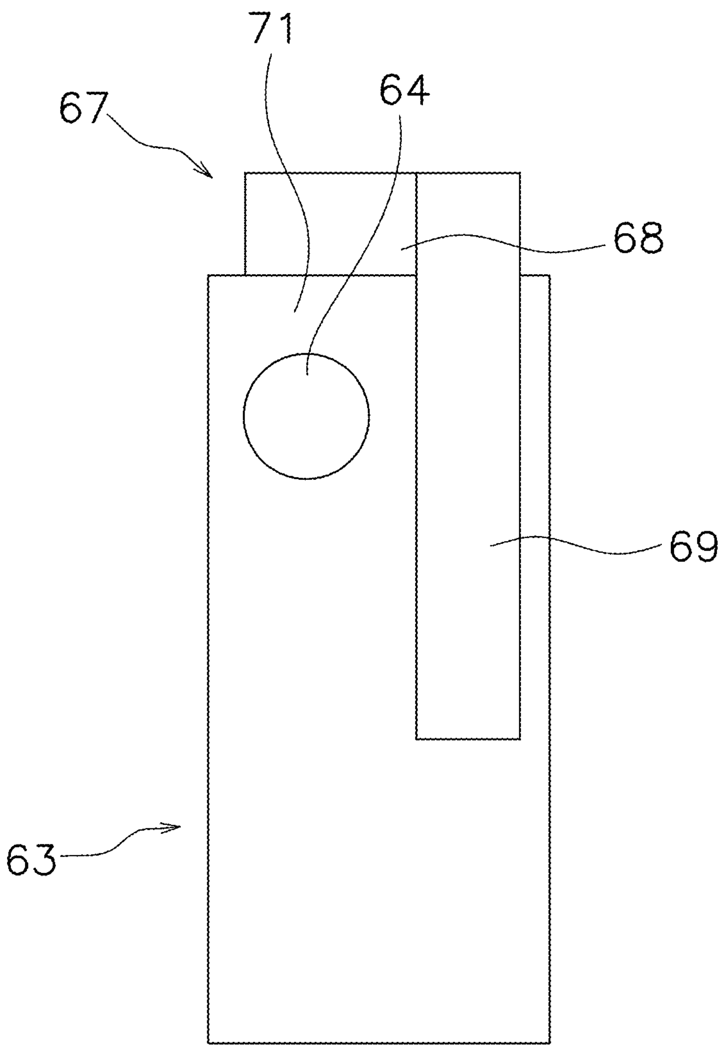
FIG. 13 is a front view showing a contact portion and an auxiliary movable terminal according to a third modified embodiment of the claimed invention.
Figure 14:
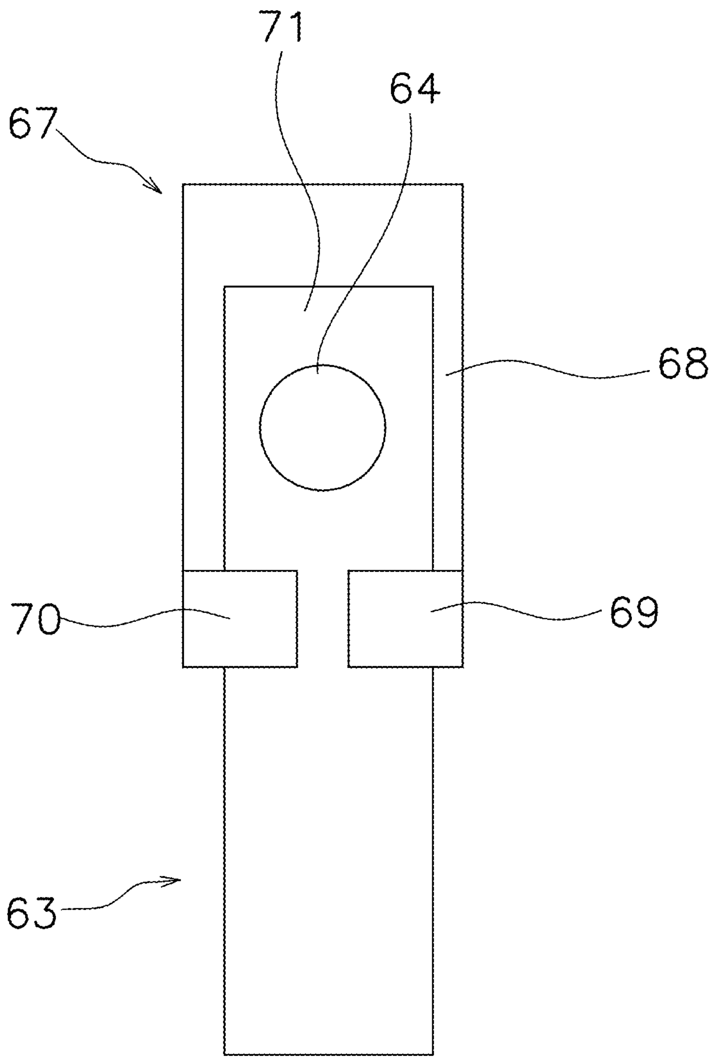
FIG. 14 is a front view showing a contact portion and an auxiliary movable terminal according to a fourth modified embodiment of the claimed invention.
Figure 15:
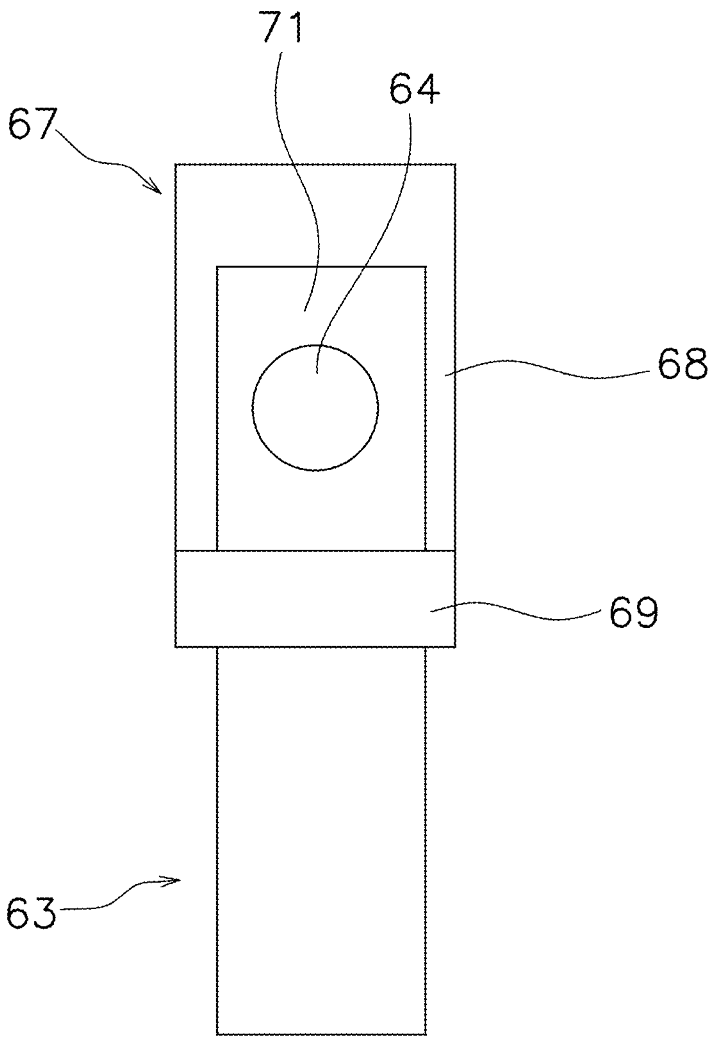
FIG. 15 is a front view showing a contact portion and an auxiliary movable terminal according to a fifth modified embodiment of the claimed invention.

FIG. 13 is a front view showing a contact portion 67 and an auxiliary movable terminal 63 according to a third modified embodiment. FIG. 14 is a front view showing a contact portion 67 and an auxiliary movable terminal 63 according to a fourth modified embodiment. As shown in FIGS. 13 and 14, the auxiliary movable terminal 63 may have a linear shape. FIG. 15 is a front view showing a contact portion 67 and an auxiliary movable terminal 63 according to a fifth modified embodiment. As shown in FIG. 15, the second contact portion 69 may be disposed across the auxiliary movable terminal 63 in the lateral direction (X1, X2).

Figure 16:
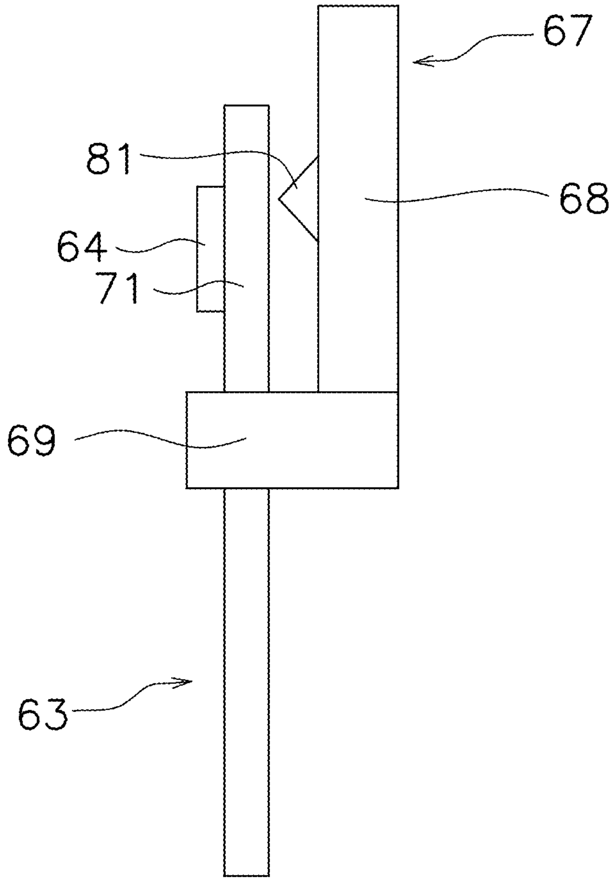
FIG. 16 is a side view showing a contact portion and an auxiliary movable terminal according to a sixth modified embodiment of the claimed invention.
Figure 17:
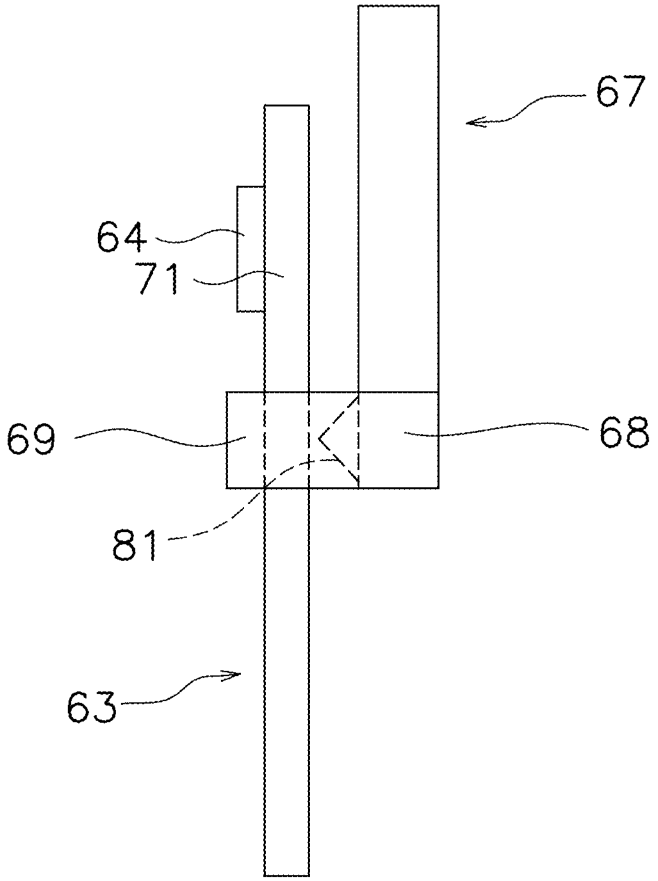
FIG. 17 is a side view showing a contact portion and an auxiliary movable terminal according to a seventh modified embodiment of the claimed invention.

FIG. 16 is a side view showing a contact portion 67 and an auxiliary movable terminal 63 according to a sixth modified embodiment. As shown in FIG. 16, the first contact portion 68 may press the tip portion of the auxiliary movable terminal 63. FIG. 17 is a side view showing a contact portion 67 and an auxiliary movable terminal 63 according to a seventh modified embodiment. As shown in FIG. 17, the first contact portion 68 may press the auxiliary movable terminal 63 at a position lower than the tip end of the auxiliary movable terminal 63. As shown in FIGS. 16 and 17, the first contact portion 68 may include a protrusion 81. The first contact portion 68 may press the auxiliary movable terminal 63 at the protrusion 81. Similarly, the second contact portion 69 and the third contact portion 70 may also include a protrusion, and press the auxiliary movable terminal 63 at the protrusion.

Figure 18:
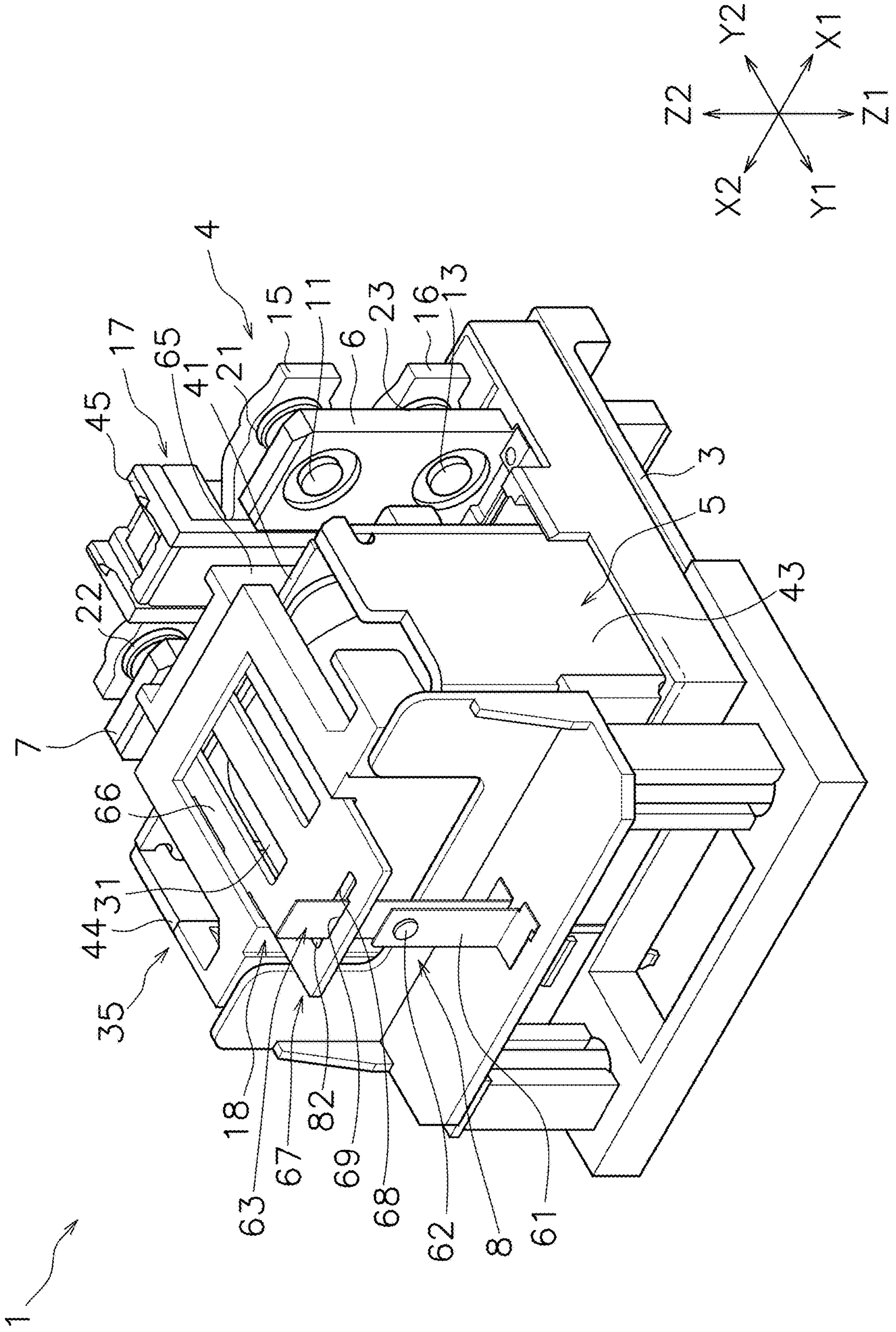
FIG. 18 is a perspective view of an electromagnetic relay according to an eighth modified embodiment of the claimed invention.

FIG. 18 is a perspective view of an electromagnetic relay 1 according to an eighth modified embodiment. As shown in FIG. 18, the contact portion 67 of the second movable member 18 may include a hole 82. The first contact portion 68 and the second contact portion 69 may be edges of the hole 82 that face each other in the movement direction (Y1, Y2).

Figure 19:
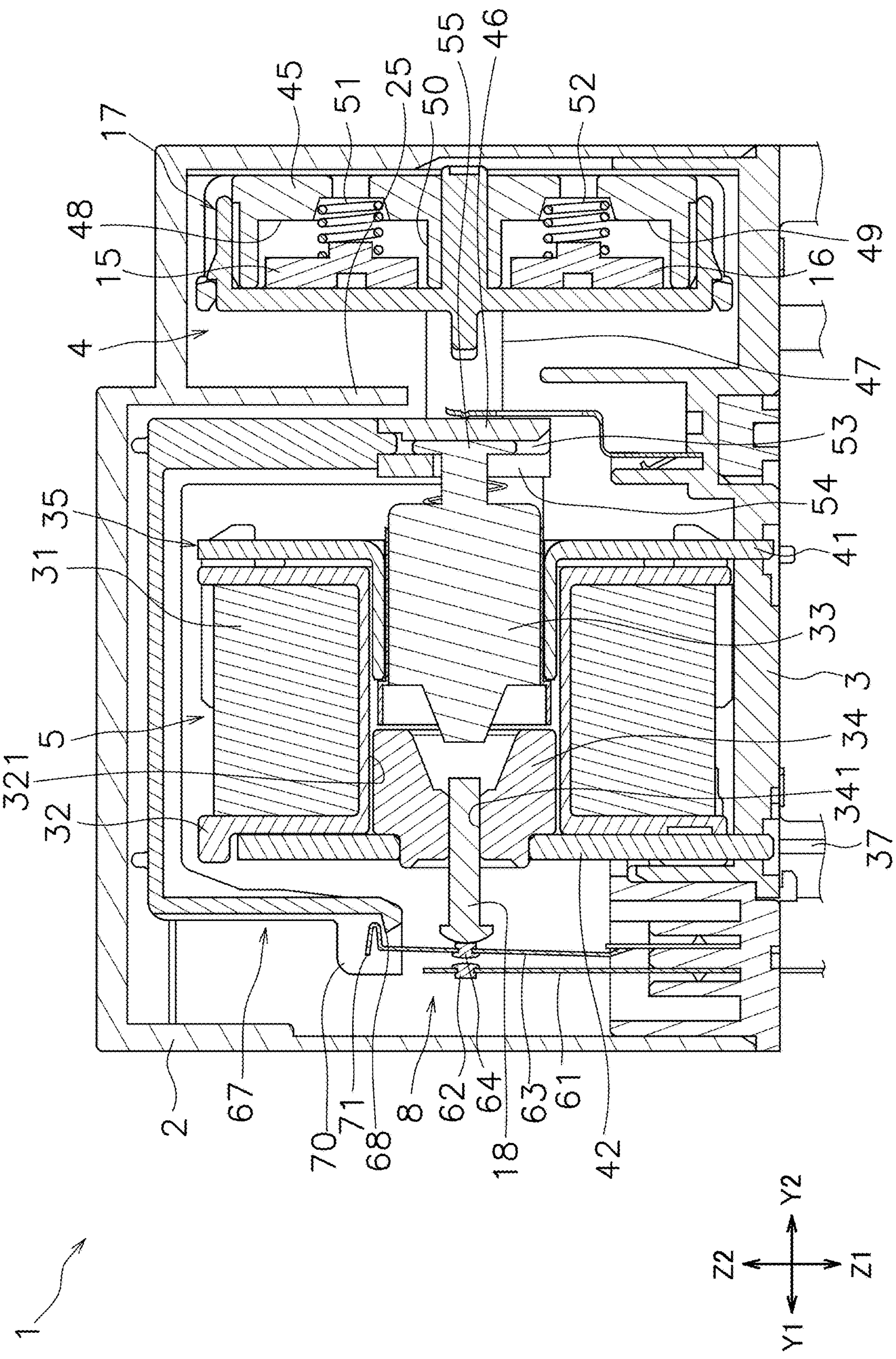
FIG. 19 is a vertical cross-sectional view of an electromagnetic relay according to a ninth modified embodiment of the claimed invention.

FIG. 19 is a vertical cross-sectional view of an electromagnetic relay 1 according to a ninth modified embodiment. As shown in FIG. 19, the second movable member 18 may extend through the hole 321 in the spool 32. The second movable member 18 may extend through the hole 341 in the fixed iron core 34. The second movable member 18 may be pressed by the movable iron core 33 to move in the first movement direction (Y1).

Figure 20:
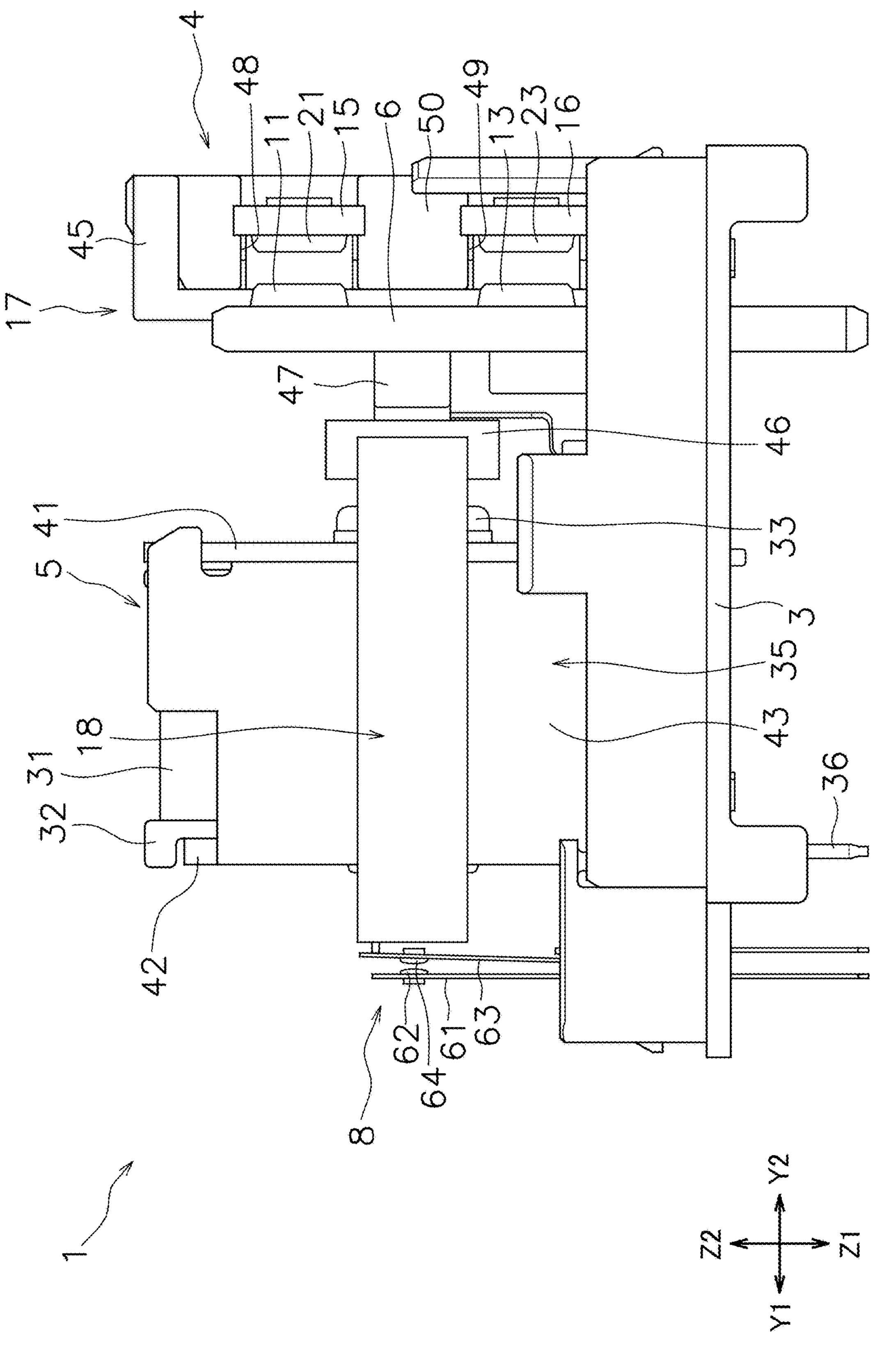
FIG. 20 is a side view of an electromagnetic relay according to a tenth modified embodiment of the claimed invention.
Figure 21:
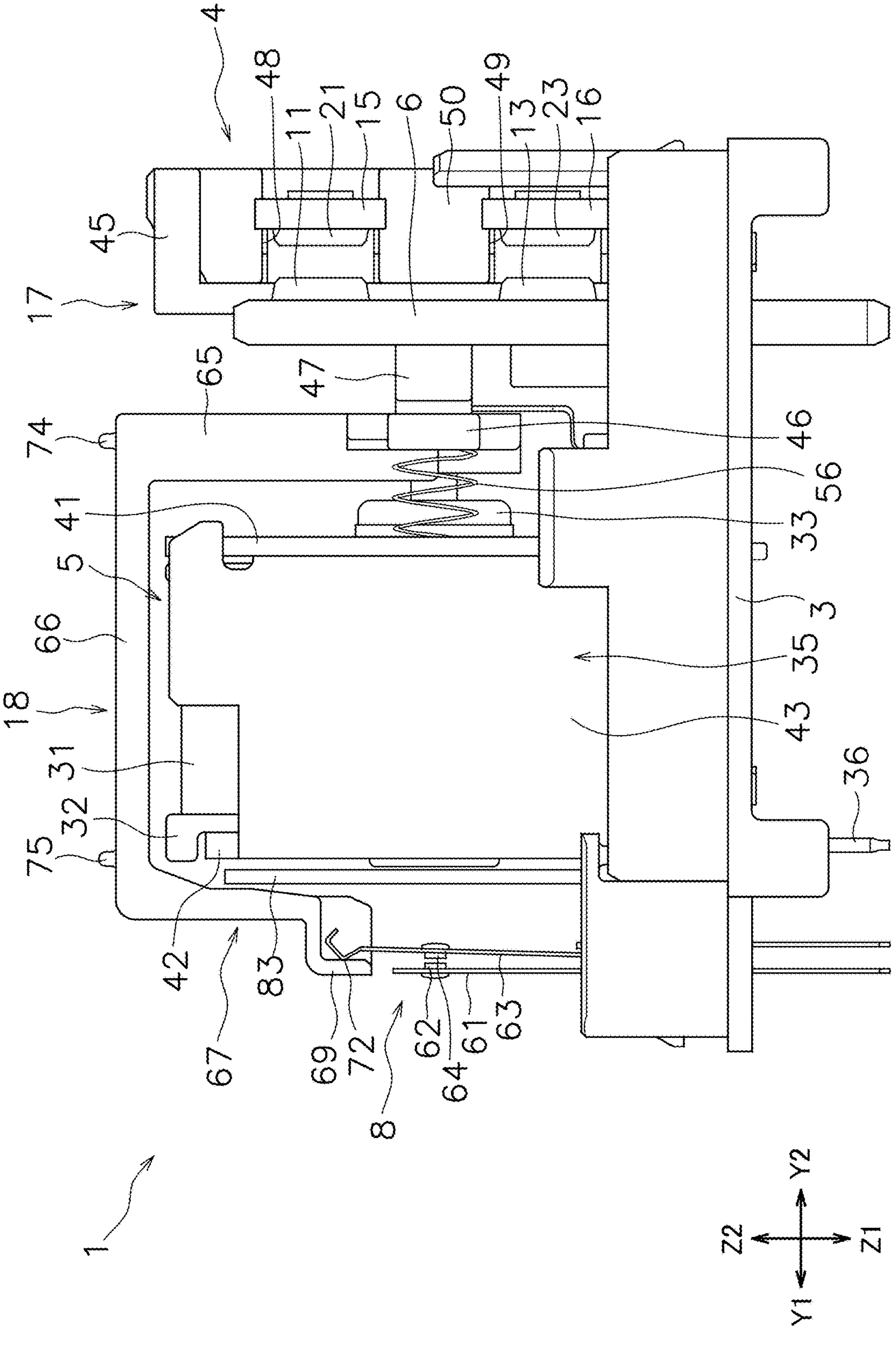
FIG. 21 is a side view of an electromagnetic relay according to an eleventh modified embodiment of the claimed invention.

FIG. 20 is a side view of the electromagnetic relay 1 according to a tenth modification. As shown in FIG. 20, the second movable member 18 may extend through a position located in the lateral direction (X1, X2) with respect to the coil unit 5. FIG. 21 is a side view of the electromagnetic relay 1 according to an eleventh modified embodiment. As shown in FIG. 21, the electromagnetic relay 1 may include an insulating wall 83. The insulating wall 83 may be disposed between the auxiliary contact unit 8 and the coil unit 5.

Figure 22:
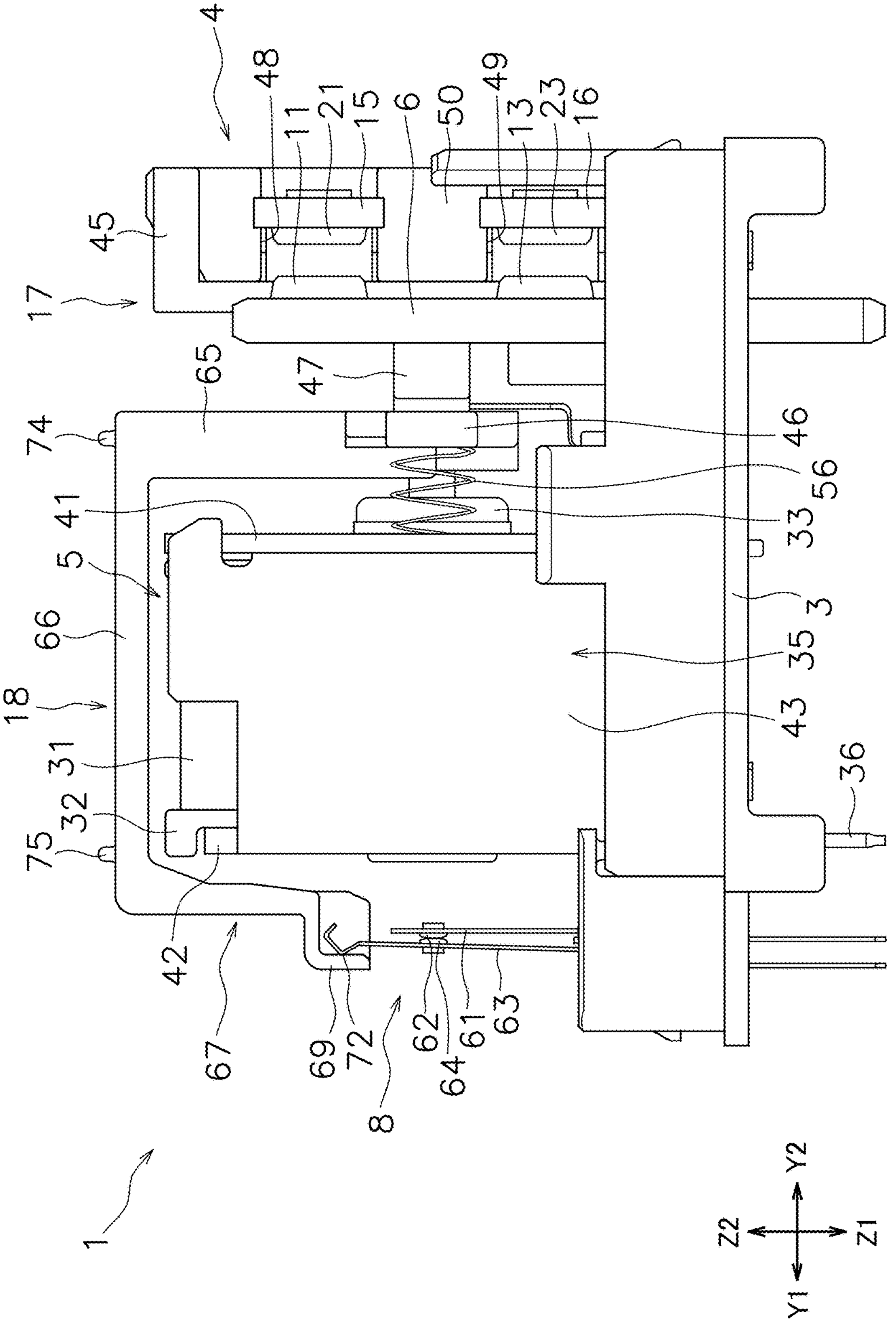
FIG. 22 is a side view of an electromagnetic relay according to a twelfth modified embodiment of the claimed invention.

In the above embodiment, in a state in which the first movable member 17 is located in the first open position, the second movable member 18 is located in the second open position, and in a state in which the first movable member 17 is located in the first closed position, the second movable member 18 is located in the second closed position. However, in a state in which the first movable member 17 is located in the first open position, the second movable member 18 may be located in the second closed position. In a state in which the first movable member 17 is located in the first closed position, the second movable member 18 may be located in the second open position. For example, FIG. 22 is a side view of the electromagnetic relay 1 according to a twelfth modified embodiment. As shown in FIG. 22, the auxiliary movable terminal 63 may be disposed in the first movement direction (Y1) with respect to the auxiliary fixed terminal 61.

REFERENCE SIGNS LIST

2: Case, 3: Base, 4: Main contact unit, 5: Coil unit, 6: First fixed terminal, 7: Second fixed terminal, 8: Auxiliary contact unit, 11: First fixed contact, 12: Second fixed contact, 15: First movable contact piece, 17: First movable member, 18: Second movable member, 21: First movable contact, 22: Second movable contact, 31: Coil, 32: Spool, 33: Movable iron core, 61: Auxiliary fixed terminal, 62: Auxiliary fixed contact, 63: Auxiliary movable terminal, 64: Auxiliary movable contact, 68: First contact portion, 69: Second contact portion, 70: Third contact portion, 74-77: Protrusion, 78: First rib, 79: Second rib, 83: Insulating wall

The invention claimed is:

1. An electromagnetic relay, comprising:

a base;

a first fixed terminal supported by the base;

a first fixed contact connected to the first fixed terminal;

a second fixed terminal supported by the base;

a second fixed contact connected to the second fixed terminal;

a main contact unit including a movable contact piece extending in a lateral direction, a first movable contact connected to the movable contact piece, a second movable contact connected to the movable contact piece, and a first movable member holding the movable contact piece between the first movable contact and the second movable contact, the first movable member being movable in a movement direction perpendicular to the lateral direction between a first closed position and a first open position, the first movable contact contacting the first fixed contact and the second movable contact contacting the second fixed contact in a state in which the first movable member is located in the first closed position, the first movable contact being separated from the first fixed contact and the second movable contact being separated from the second fixed contact in a state in which the first movable member is located in the first open position, the main contact unit being supported by the base in a first support direction perpendicular to the lateral direction and the movement direction;

a coil unit supported by the base in the first support direction, the coil unit including a coil, a spool including a hole extending in the movement direction and around which the coil is wound, and a movable iron core disposed in the hole of the spool and connected to the first movable member;

an auxiliary contact unit disposed on an opposite side of the main contact unit with respect to the coil unit in the movement direction of the first movable member, the auxiliary contact unit including an auxiliary fixed terminal electrically insulated from the first fixed terminal and the second fixed terminal, an auxiliary fixed contact connected to the auxiliary fixed terminal, an auxiliary movable terminal electrically insulated from the movable contact piece, and an auxiliary movable contact connected to the auxiliary movable terminal; and a second movable member that is movable between a second closed position and a second open position, the auxiliary movable contact contacting the auxiliary fixed contact in a state in which the second movable member is located in the second closed position, the auxiliary movable contact being separated from the auxiliary fixed contact in a state in which the second movable member is located in the second open position, the second movable member being configured to move in the movement direction in conjunction with the first movable member.

2. The electromagnetic relay according to claim 1, wherein the first movable contact, the second movable contact, and the auxiliary movable contact are movable in the movement direction.

3. The electromagnetic relay according to claim 1, wherein the movement direction includes a first movement direction from the main contact unit toward the coil unit and a second movement direction opposite to the first movement direction, the coil unit further includes a fixed iron core disposed to face the movable iron core, the movable iron core is disposed in the second movement direction with respect to the fixed iron core, and the first movable member moves in the first movement direction to move from the first open position to the first closed position.

4. The electromagnetic relay according to claim 1, wherein the second movable member extends through a position located in a second support direction opposite to the first support direction with respect to the coil unit.

5. The electromagnetic relay according to claim 1, wherein the second movable member extends through a position located in the lateral direction with respect to the coil unit.

6. The electromagnetic relay according to claim 1, wherein the second movable member extends through the hole in the spool.

7. The electromagnetic relay according to claim 1, further comprising a case attached to the base and covering the coil unit, wherein the second movable member includes a protrusion protruding toward the case.

8. The electromagnetic relay according to claim 1, further comprising a case attached to the base and covering the coil unit, wherein the lateral direction includes a first lateral direction and a second lateral direction opposite the first lateral direction, and the case includes a first rib protruding from an inner surface of the case and disposed in the first lateral direction with respect to the second movable member and a second rib protruding from the inner surface of the case and disposed in the second lateral direction with respect to the second movable member.

9. The electromagnetic relay according to claim 1, wherein the second movable member is in contact with the auxiliary movable terminal in the state in which the first movable member is located in the first open position.

10. The electromagnetic relay according to claim 1, wherein the second movable member includes a first contact portion disposed on an opposite side of the auxiliary fixed contact with respect to the auxiliary movable terminal in the movement direction, the first contact portion being configured to contact the auxiliary movable terminal, and a second contact portion disposed on the same side as the auxiliary fixed contact with respect to the auxiliary movable terminal in the movement direction, the second contact portion being configured to contact the auxiliary movable terminal.

11. The electromagnetic relay according to claim 10, wherein the second contact portion is disposed to be shifted in the lateral direction with respect to the auxiliary movable contact.

12. The electromagnetic relay according to claim 10, wherein the second movable member further includes a third contact portion disposed on the same side as the auxiliary fixed contact with respect to the auxiliary movable terminal in the movement direction, the third contact portion being configured to contact the auxiliary movable terminal, and the first contact portion is disposed between the second contact portion and the third contact portion in the lateral direction.

13. The electromagnetic relay according to claim 1, further comprising an insulating wall disposed between the auxiliary contact unit and the coil unit.

14. The electromagnetic relay according to claim 1, wherein in the state in which the first movable member is located in the first open position, the second movable member is located in the second open position, and in the state in which the first movable member is located in the first closed position, the second movable member is located in the second closed position.

15. The electromagnetic relay according to claim 1, wherein in the state in which the first movable member is located in the first open position, the second movable member is located in the second closed position, and in the state in which the first movable member is located in the first closed position, the second movable member is located in the second open position.

16. The electromagnetic relay according to claim 1, wherein the first fixed terminal, the second fixed terminal, the auxiliary fixed terminal, and the auxiliary movable terminal protrude from the base in a same direction to an outside of the electromagnetic relay.

* * * * *